United States Patent
Kim et al.

(10) Patent No.: US 11,831,364 B2
(45) Date of Patent: *Nov. 28, 2023

(54) MIMO ANTENNA ASSEMBLY HAVING STACKED STRUCTURE

(71) Applicant: KMW INC., Hwaseong-si (KR)

(72) Inventors: Duk Yong Kim, Hwaseong-si (KR); Bae Mook Jeong, Hwaseong-si (KR); Chang Woo Yoo, Hwaseong-si (KR); Young Chan Moon, Hwaseong-si (KR); Nam Shin Park, Hwaseong-si (KR); Bum Sik Park, Hwaseong-si (KR); Min Seon Yun, Hwaseong-si (KR); Min Sik Park, Hwaseong-si (KR); Sung Ho Jang, Hwaseong-si (KR)

(73) Assignee: KMW INC., Hwaseong-si (KR)

(*) Notice: Subject to any disclaimer, the term of this patent is extended or adjusted under 35 U.S.C. 154(b) by 129 days.

This patent is subject to a terminal disclaimer.

(21) Appl. No.: 17/367,364

(22) Filed: Jul. 4, 2021

(65) Prior Publication Data

US 2021/0336659 A1 Oct. 28, 2021

Related U.S. Application Data

(63) Continuation of application No. 16/412,426, filed on May 15, 2019, now Pat. No. 11,088,731, which is a
(Continued)

(30) Foreign Application Priority Data

Nov. 16, 2016 (KR) .................. 10-2016-0152609
Mar. 6, 2017 (KR) .................. 10-2017-0028430
(Continued)

(51) Int. Cl.
*H04B 7/0413* (2017.01)
*H01Q 3/26* (2006.01)
(Continued)

(52) U.S. Cl.
CPC ........... *H04B 7/0413* (2013.01); *H01Q 3/267* (2013.01); *H01Q 21/0006* (2013.01);
(Continued)

(58) Field of Classification Search
CPC .. H04B 7/0413; H01Q 3/267; H01Q 21/0006; H01Q 21/065; H01Q 21/29; H01Q 25/001; H01Q 1/02
See application file for complete search history.

(56) References Cited

U.S. PATENT DOCUMENTS 4,628,409 A * 12/1986 Thompson ........... H05K 3/3447
228/180.1
5,647,755 A * 7/1997 Hida .................. H01R 12/7005
439/157
(Continued)

FOREIGN PATENT DOCUMENTS

CN 104247279 A 11/2009
CN 104508995 A 11/2015
(Continued)

OTHER PUBLICATIONS

Extended European Search Report dated Aug. 25, 2021 for European Application No. 21171645.1.
(Continued)

*Primary Examiner* — John D Blanton
(74) *Attorney, Agent, or Firm* — Insight Law Group, PLLC; Seung Lee

(57) ABSTRACT

Provided is a multiple-input multiple-output (MIMO) antenna having a lightweight stacked structure. According to one aspect of the present invention, there is provided a
(Continued)

MIMO antenna assembly having a lightweight stacked structure, in which a calibration network, which was provided between antenna elements and filters in the related art, is provided on one printed circuit board (PCB), together with a power amplifier and a digital circuit, and filters are closely coupled to the bottom of the PCB on which the feeding network is provided. The present invention employs a strategy in which an antenna assembly is reduced to a compact size while managing phase deviation caused due to filters at an acceptable level. According to another aspect of the present invention, there is provided a calibration method, in which transmission/reception (TX/RX) calibration may be performed by a single calibration hardware component of a MIMO antenna operated by a time division duplex (TDD) scheme and may be performed in real time during the operation of the MIMO antenna, and the MIMO antenna employing the calibration method.

20 Claims, 19 Drawing Sheets

Related U.S. Application Data continuation of application No. PCT/KR2017/013034, filed on Nov. 16, 2017.

(30) Foreign Application Priority Data

Mar. 6, 2017 (KR) .................. 10-2017-0028434
Mar. 6, 2017 (KR) .................. 10-2017-0028442

(51) Int. Cl.
*H01Q 21/00* (2006.01)
*H01Q 21/06* (2006.01)
*H01Q 21/29* (2006.01)
*H01Q 25/00* (2006.01)
H01Q 1/02 (2006.01)
H01Q 1/42 (2006.01)
H01R 12/73 (2011.01)

(52) U.S. Cl.
CPC .......... *H01Q 21/065* (2013.01); *H01Q 21/29* (2013.01); *H01Q 25/001* (2013.01); H01Q 1/02 (2013.01); H01Q 1/42 (2013.01); H01R 12/73 (2013.01)

(56) References Cited

U.S. PATENT DOCUMENTS

| | | | |
|---|---|---|---|
| 2004/0061644 A1* | 4/2004 | Lier | H01Q 21/22 342/368 |
| 2004/0203528 A1* | 10/2004 | Ammar | H01Q 21/0087 455/90.3 |
| 2005/0012658 A1* | 1/2005 | Eriksson | H01Q 3/267 342/368 |
| 2007/0149251 A1* | 6/2007 | Jeon | H01Q 3/267 455/562.1 |
| 2010/0093282 A1 | 4/2010 | Martikkala et al. | |
| 2010/0128671 A1 | 5/2010 | Chen et al. | |
| 2013/0044036 A1 | 2/2013 | Kuonanoja | |
| 2014/0242914 A1 | 8/2014 | Monroe | |
| 2015/0365276 A1* | 12/2015 | Porter | H04L 5/14 370/254 |
| 2016/0097879 A1 | 4/2016 | Stolarczyk et al. | |
| 2017/0227598 A1* | 8/2017 | Lam | G01R 31/2834 |
| 2017/0317428 A1* | 11/2017 | Petropoulos | H01Q 21/065 |
| 2018/0301781 A1* | 10/2018 | Peng | H01P 7/04 |
| 2019/0115643 A1* | 4/2019 | Khan | H01Q 9/42 |

FOREIGN PATENT DOCUMENTS

| | | |
|---|---|---|
| CN | 205509001 U | 8/2016 |
| EP | 2415186 A2 | 2/2012 |
| EP | 2755276 A1 | 7/2014 |
| EP | 2015-106802 A1 | 7/2015 |
| EP | 2889957 A1 | 7/2015 |
| JP | 2001-313581 A | 11/2001 |
| JP | 2009-278529 A | 11/2009 |
| JP | 2012-520584 A | 9/2012 |
| JP | 2015-211056 A | 11/2015 |
| KR | 10-2007-0067912 A | 6/2007 |
| KR | 10-2008-0081753 A | 7/2009 |
| KR | 10-2012-0109670 A | 10/2012 |
| WO | 2016-177115 A1 | 11/2016 |
| WO | 2016/177115 A1 | 11/2016 |

OTHER PUBLICATIONS

Chinese office action dated Dec. 23, 2020 for Chinese Application No. 201780070521.6 and its English translation.
Japanese office action dated Jun. 30, 2020 for Japanese Application No. 2019-525742.
International Search Report for PCT/KR2017/013034 dated Feb. 26, 2018 and its English translation.
Non-Final office action dated May 22, 2020 for U.S. Appl. No. 16/412,426.
Final office action dated Nov. 17, 2020 for U.S. Appl. No. 16/412,426.
Advisory action dated Mar. 8, 2021 for U.S. Appl. No. 16/412,426.
Notice of Allowace dated Mar. 31, 2021 for U.S. Appl. No. 16/412,426.

* cited by examiner

MIMO ANTENNA ASSEMBLY HAVING STACKED STRUCTURE

CROSS-REFERENCE TO RELATED APPLICATIONS

This application a continuation of U.S. application Ser. No. 16/412,426, filed May 15, 2019 (now pending), which is a continuation of International Application PCT/KR2017/013034 filed Nov. 16, 2017, which claims priority to Korean Patent Application No. 10-2016-0152609, filed on Nov. 16, 2016, Korean Patent Application No. 10-2017-0028430, filed on Mar. 6, 2017, Korean Patent Application No. 10-2017-0028434, filed on Mar. 6, 2017, and Korean Patent Application No. 10-2017-0028442, filed on Mar. 6, 2017, in the Korean Intellectual Property Office (KIPO), the entire contents of which are incorporated herein by reference.

TECHNICAL FIELD

The present invention relates to a multiple-input multiple-output (MIMO) antenna, and more particularly, to a MIMO antenna assembly having a lightweight stacked structure and calibration performed by a MIMO antenna operated by a time division duplex (TDD) scheme.

BACKGROUND

Information disclosed in this section is merely intended to provide background information regarding embodiments and does not form prior art.

A multiple-input multiple-output (MIMO) technique is a spatial multiplexing technique for dramatically increasing a data transmission rate using a plurality of antennas, in which a transmitter transmits different data via transmitting antennas and a receiver identifies the transmitted different data through appropriate signal processing. Accordingly, more data may be transmitted by increasing a channel capacity by increasing the number of transmitting/receiving antennas. For example, it is possible to secure a channel capacity that is about 10 times that of a current single antenna system by increasing the number of antennas to 10, when the same frequency band is used.

Up to 8 antennas are used in 4 G LTE-Advanced. Products with 64 or 128 antennas are currently being developed at a pre-5 G stage. In 5 G, base station equipment with a much larger number of antennas is expected to be used, which is called massive MIMO technology. Current cell operation is two-dimensional, whereas when massive MIMO technology is employed, three-dimensional (3D)-beamforming can be performed and thus massive MIMO technology is also called full-dimensional (FD)-MIMO.

In Massive MIMO technology, as the number of antennas is increased, the numbers of transmitters and filters increase accordingly. Nevertheless, due to lease costs of an installation space or space constraints, the success or failure of an antenna employing massive MIMO technology depends on how small, light, and expensive RF machine parts (antenna elements/filters/power amplifiers/transceivers, etc.) are. A high power output is necessary to expand coverage of a massive MIMO antenna but power consumption and heat caused by the high power output are negative factors in reducing the weight and size of the antenna.

It is therefore an object of the present invention to develop a structure of a compact and lightweight antenna system capable of facilitating electrical connection and assembly of a plurality of radio-frequency (RF) elements is in urgent demand.

SUMMARY

Technical Problem

The present invention is directed to a multiple-input multiple-output (MIMO) antenna device having a compact and lightweight stacked structure.

The present invention is also directed to an assembly method of minimizing the amount of cumulative assembly tolerances occurring during the assembly of a plurality of filters, and a structure capable of uniformly transmitting a clamping force necessary to secure electrical characteristics of filters.

The present invention is also directed to a calibration method, in which transmission/reception (TX/RX) calibration may be performed by a single calibration hardware component of a MIMO antenna operated by a time division duplex (TDD) scheme, and performed in real time during an operation of the MIMO antenna.

Technical Solution

In accordance with one aspect of an embodiment, there is provided a multiple-input multiple-output (MIMO) antenna system with an antenna assembly having a stacked structure. In the MIMO antenna system, the antenna assembly having a stacked structure is embedded between a radome and a housing including a heat sink on a rear side thereof. The antenna assembly having the stacked structure includes a first printed circuit board (PCB) on which a feeding network is provided; a plurality of antenna elements provided on an upper surface of the first PCB opposite the radome and electrically connected to the feeding network; and a filter assembly provided on a lower surface of the first PCB, and including a plurality of band-pass filters electrically connected to the feeding network. The antenna assembly having the stacked structure further includes a second PCB which is arranged opposite the housing and on which a plurality of transmitting and receiving circuits electrically connected to the plurality of band-pass filters are provided.

In accordance with another aspect of an embodiment, a MIMO antenna assembly having a stacked structure is provided. The MIMO antenna assembly having the stacked structure includes a first printed circuit board (PCB) on which a feeding network is provided; a plurality of antenna elements provided on an upper surface of the first PCB and connected to the feeding network; and a filter assembly provided on a lower surface of the first PCB and including a plurality of band-pass filters connected to the feeding network. The MIMO antenna assembly having the stacked structure further includes a second PCB provided at a bottom of the first PCB. A plurality of transmitting and receiving circuits connected to the plurality of band-pass filters, a digital circuit connected to the plurality of transmitting and receiving circuits and configured to perform digital processing on a baseband signal, and a calibration circuit with a plurality of switches connected in a tree structure is provided on the second PCB.

In accordance with another aspect of an embodiment, there is provided a MIMO antenna assembly including a first PCB on which a feeding network and a plurality of through-holes electrically connected to the feeding network are provided; a plurality of antenna elements provided on an upper surface of the first PCB and connected to the feeding network; and a plurality of band-pass filters closely fastened to a lower surface of the first PCB. Each of the plurality of band-pass filters includes a first port provided with a first conductive pin extending from an internal cavity and protruding from an upper surface of the band-pass filter, and each of the plurality of band-pass filters is closely fastened to the first PCB such that a protruding portion of the first conductive pin is inserted into one of the plurality of through-holes of the first PCB. In embodiments, the MIMO antenna assembly may further include at least one of features which will be described below.

In some embodiments, the first port includes an opening section formed in the upper surface thereof; an insulating bush inserted into the opening section to air-tightly close the opening section; and the first conductive pin passing through the insulating bush to protrude from the insulating bush.

In some embodiments, a plurality of fastening grooves are formed in the upper surface of each of the plurality of band-pass filters to be fastened to the PCB via bolts.

In some embodiments, the plurality of band-pass filters form a filter assembly by being assembled in a line to a push bar having insertion protrusions to be inserted into insertion holes of the first PCB.

In some embodiments, the plurality of band-pass filters include stepped parts configured to accommodate the push bar, the stepped parts are provided with insertion protrusions and fastening holes, and the push bar is provided with insertion grooves into which the insertion protrusions of the plurality of band-pass filters are inserted and a plurality of fastening grooves fastened with the fastening holes of the plurality of band-pass filters via bolts.

In some embodiments, the MIMO antenna assembly further includes a second PCB provided with a plurality of transmitting and receiving circuits connected to the plurality of band-pass filters.

In some embodiments, a plurality of radio-frequency (RF) sockets connected to the plurality of transmitting and receiving circuits are mounted on an upper surface of the second PCB; and each of the plurality of band-pass filters includes a second port provided with a protruding part protruding from a lower surface of the band-pass filter and having a groove in a center thereof, wherein one of the plurality of RF sockets is inserted in the groove, and a conductive pin extending from an internal cavity to pass through the groove of the protruding part, each of the plurality of band-pass filters being coupled to the second PCB such that a portion of the conductive pin is inserted into a groove formed in one of the plurality of RF sockets.

In some embodiments, the second port of each of the plurality of band-pass filters includes an opening section formed in the groove; an insulating bush inserted into the opening section to air-tightly close the opening section; and the conductive pin passing through the insulating bush to protrude from the insulating bush.

In some embodiments, a plurality of structures each including a contact pad electrically connected to one of the plurality of transmitting and receiving circuits are mounted on an upper surface of the second PCB; and each of the plurality of band-pass filters includes a second port provided with a conductive plunger electrically connected to an internal cavity and protruding from a lower surface of the band-pass filter, and is coupled to the second PCB such that the conductive plunger is in contact with one of the plurality of contact pads.

In some embodiments, the second port of each of the plurality of band-pass filters includes an opening section formed in the lower surface; an insulating bush inserted into the opening section to air-tightly close the opening section; a cylindrical barrel passing through the insulating bush to protrude from the insulating bush; the plunger, at least a portion of which is inserted into the cylindrical barrel; and a spring provided in the cylindrical barrel to support the plunger.

In some embodiments, the plurality of band-pass filters form a filter assembly by being assembled in a line to a push bar fastened to the second PCB, and the push bar fastened to the second PCB applies uniform pressure to the plurality of band-pass filters such that the plurality of band-pass filters are coupled to the second PCB by a uniform force.

In some embodiments, fastening grooves are formed in lower surfaces of the plurality of band-pass filters to be fastened with the second PCB, on which a plurality of transmitting and receiving circuits are provided, via bolts.

In accordance with another aspect of an embodiment, there is provided a MIMO antenna assembly including a first PCB on which a feeding network and a plurality of contact pads electrically connected to the feeding network are provided; a plurality of antenna elements provided on an upper surface of the first PCB and connected to the feeding network; and a plurality of band-pass filters closely fastened to a lower surface of the first PCB. Each of the plurality of band-pass filters includes a first port provided with a first conductive plunger extending from an internal cavity and protruding from an upper surface of the band-pass filter, and is closely fastened to the first PCB such that the first plunger is in contact with the contact pad of the first PCB. In embodiments, the MIMO antenna assembly may further include at least one of features which will be described below.

In some embodiments, the first port includes an opening section formed in the upper surface; an insulating bush configured to be inserted into the opening section to air-tightly close the opening section; a cylindrical barrel passing through the insulating bush to protrude from the insulating bush; the conductive plunger, at least a portion of which is inserted into the cylindrical barrel; and a spring provided in the cylindrical barrel to support the conductive plunger.

In some embodiments, the MIMO antenna assembly further includes a second PCB provided with a plurality of transmitting and receiving circuits connected to the plurality of band-pass filters.

In some embodiments, a plurality of structures each including a contact pad electrically connected to one of the plurality of transmitting and receiving circuits are mounted on an upper surface of the second PCB; and each of the plurality of band-pass filters includes a second port provided with a conductive plunger electrically connected to an internal cavity and protruding from a lower surface of the band-pass filter, and is coupled to the second PCB such that the conductive plunger is in contact with one of the plurality of contact pads.

In some embodiments, the second port of each of the plurality of band-pass filters includes an opening section formed in the lower surface; a bush inserted into the opening section to air-tightly close the opening section; a cylindrical barrel passing through the bush to protrude from the bush; the conductive plunger, at least a portion of which is inserted into the cylindrical barrel; and a spring provided in the cylindrical barrel to support the conductive plunger.

In some embodiments, a plurality of structures each including a contact pad electrically connected to one of the plurality of transmitting and receiving circuits are mounted on an upper surface of the second PCB; and each of the plurality of band-pass filters includes a second port provided with a conductive rod extending from an internal cavity and protruding from a lower surface of the band-pass filter, and is coupled to the second PCB such that the conductive rod is in contact with one of the plurality of contact pads.

In some embodiments, the second port of each of the plurality of band-pass filters includes an opening section formed in the lower surface; an insulating bush inserted into the opening section to air-tightly close the opening section; and the conductive rod passing through the insulating push to protrude from the insulating bush.

In accordance with another aspect of an embodiment, each of the plurality of band-pass filters includes a first port provided with a conductive rod electrically connected to an internal cavity and protruding from the upper surface of the band-pass filter; and is closely fastened to the first PCB such that the conductive rod is in contact with one of the contact pads of the first PCB. In some embodiments, the first port includes an opening section formed in the upper surface; an insulating bush inserted into the opening section to air-tightly close the opening section; a conductive pin passing through the insulating bush to protrude from the insulating bush; and the conductive rod fixed onto an end of the conductive pin in a vertical direction.

In accordance with another aspect of the present invention, a MIMO antenna system operated according to a time division duplex (TDD) communication protocol includes a plurality of antenna elements, a plurality of band-pass filters connected to the plurality of antenna elements, and a plurality of transmitting and receiving circuits connected to the plurality of band-pass filters. Each of the transmitting and receiving circuits includes an RF interface connected to one of the plurality of band-pass filters, and a transmission path and a reception path connected to the RF interface by time division. The MIMO antenna system further includes a calibration network with a plurality of switches in a tree structure. In the tree structure, an uppermost switch is selectively connected to a specific transmission path among the transmission paths and a specific reception path among the reception paths, and a plurality of lowermost switches are connected to a plurality of directional couplers coupled to the RF interfaces of the plurality of transmitting and receiving circuits. In the MIMO antenna system, the specific transmission path is used to supply a pilot signal for calibration of the reception paths in a downlink time interval, and the specific reception path is used as a feedback path for calibration of the transmission paths in an uplink time interval. In embodiments, the MIMO antenna system may further include at least one of features which will be described below.

In some embodiments, the MIMO antenna system further includes a processing circuit connected to the plurality of transmitting and receiving circuits, and configured to perform transmission calibration for the transmission paths and reception calibration for the reception paths.

In some embodiments, the processing circuit performs transmission calibration and reception calibration by including an RF deviation of the plurality of band-pass filters and antenna feeder lines, which is measured in advance, as an offset value in a deviation between the transmission paths and a deviation between the reception paths.

In some embodiments, the processing circuit performs calibration in real time during the operation of the MIMO antenna system.

In some embodiments, the plurality of transmitting and receiving circuits, the calibration network, and the processing circuit are provided on one PCB.

In some embodiments, the processing circuit forms a first calibration path consisting of the plurality of directional couplers, the calibration network, and the specific reception path, obtains a transmission signal passing through each of the transmission paths via the first calibration path, and performs transmission calibration based on a comparison between a transmission signal supplied to each of the transmission paths and a transmission signal obtained via the first calibration path.

In some embodiments, the processing circuit produces a pilot signal for calibration of each of the reception paths, forms a second calibration path consisting of the specific transmission path, the calibration network, and the directional couplers, inserts the produced pilot signal into each of the reception paths via the second calibration path, and performs transmission calibration based on a comparison between the produced pilot signal and a pilot signal extracted from an output signal of each of the reception paths.

In some embodiments, each of the receiving circuits includes an up-converter, a D/A converter, and a power amplifier (PA), the specific transmission path further includes a switch between the power amplifier and the D/A converter, and the switch includes a switch configured to bypass a pilot signal, which is to be supplied to the specific transmission path, to the calibration network in an uplink time interval.

In some embodiments, each of the receiving circuits includes a low-noise amplifier (LNA), an A/D converter and a down-converter, the specific reception path further includes a switch between the low-noise amplifier and the A/D converter, and the switch includes a switch to which a transmission signal fed back from the calibration network and passing through each of the transmission paths is input in a downlink time interval.

In some embodiments, the pilot signal has an in-band frequency of a reception signal.

In some embodiments, the pilot signal has an out-band frequency of the reception signal.

In some embodiments, each of the transmitting and receiving circuits further includes the transmission path, the reception path, and a circulator connected to the RF interface, a reception signal input to the circulator from the RF interface is transmitted to the reception path, and a transmission signal input to the circulator from the transmission path is transmitted to the RF interface.

In some embodiments, the reception path is connected to the circulator via a TDD switch; and the TDD switch includes a first input terminal connected to the circulator, a first output terminal connected to the reception path, and a second output terminal connected to a terminating resistor. The first input terminal of the TDD switch is connected to the second output terminal thereof in a downlink time interval.

In accordance with another aspect of an embodiment, there is provided a method of calibrating a MIMO antenna system which includes a plurality of antennas, a plurality of band-pass filters connected to the plurality of antennas, a plurality of transmitting and receiving circuits connected to the plurality of band-pass filters and configured to transmit and receive signals via the plurality of antennas and according to a TDD communication protocol, and a calibration network with a plurality of switches connected in a tree structure. The method includes forming a first calibration path which includes directional couplers coupled to branches between the plurality of transmitting and receiving circuits and the plurality of band-pass filters, the calibration network, and a reception path included in a specific transmitting and receiving circuit among the plurality of transmitting and receiving circuits. The method further includes obtaining a transmission signal transmitted to the plurality of band-pass filters through the first calibration path, and performing transmission calibration based a comparison between a transmission signal supplied to each of transmission paths and a transmission signal obtained through the first calibration path. In embodiments, the method may further include at least one of features which will be described below.

In some embodiments, the forming of the first calibration path and the obtaining of the transmission signal are performed in a downlink time interval.

In some embodiments, the performing of transmission calibration includes including an RF deviation of the plurality of band-pass filters, which is measured in advance, as an offset value in a deviation between the transmission paths included in the respective transmitting and receiving circuits.

In some embodiments, the method further includes producing a pilot signal for calibration of each reception path; forming a second calibration path which includes directional couplers coupled to branches between the plurality of transmitting and receiving circuits and the band-pass filters, the calibration network, and a transmission path included in a specific transmitting and receiving circuit among the plurality of transmitting and receiving circuits; inserting the pilot signal into the transmission path included in the specific transmitting and receiving circuit so as to insert the pilot signal into reception paths included in the plurality of transmitting and receiving circuits via the second calibration path; and performing reception calibration based on a comparison between the produced pilot signal and an output signal of each of the reception paths.

In some embodiments, the forming of the second calibration path and the inserting of the pilot signal are performed in an uplink time interval.

In some embodiments, the performing of reception calibration includes including an RF deviation of the plurality of band-pass filters and antenna feeder lines, which is measured in advance, as an offset value in a deviation between the reception paths included in the respective transmitting and receiving circuits.

DETAILED DESCRIPTION

Figure 1:
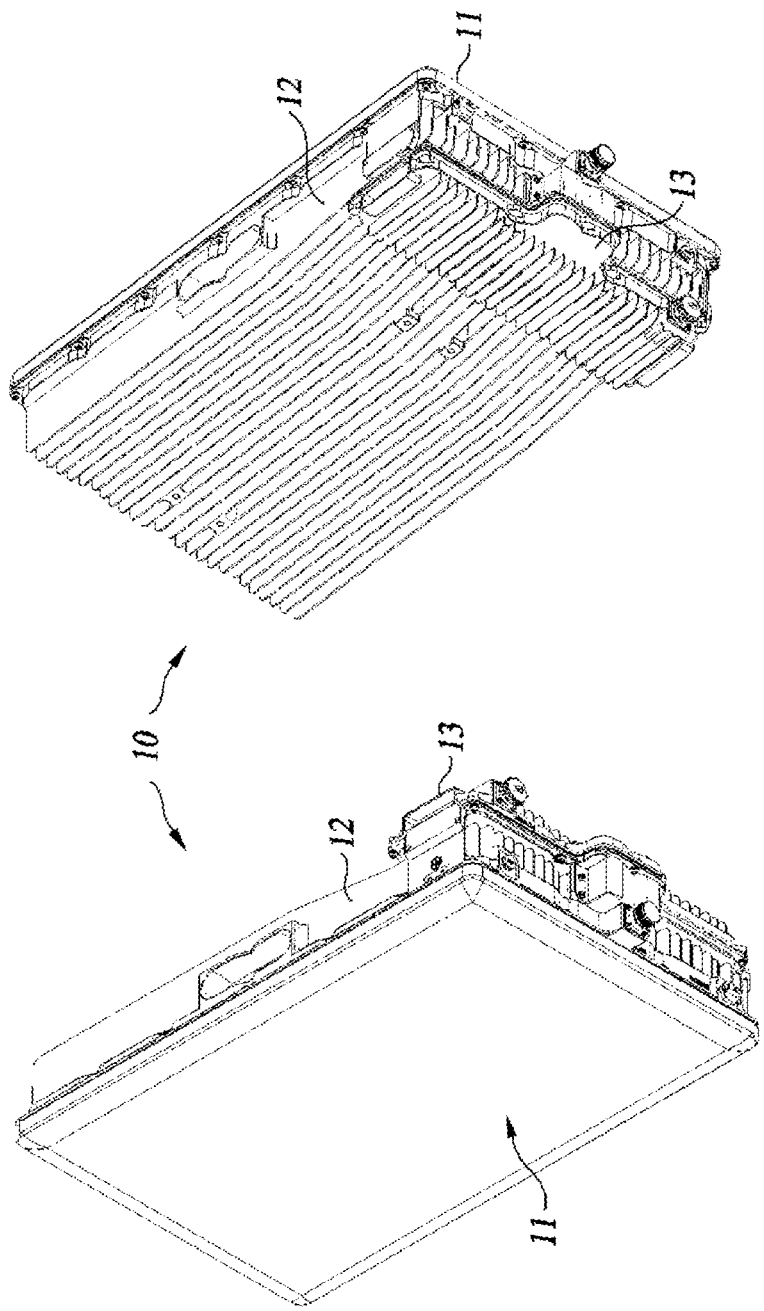
FIG. 1 is a perspective view of an example of an external shape of an antenna device having an antenna assembly therein, according to the present invention.

Hereinafter, some embodiments of the present invention will be described in detail with reference to the accompanying drawings. It should be noted that the same reference numerals are assigned to the same elements even in different drawings, if possible. In the following description of the present invention, well-known functions or constructions are not described in detail if it is determined that they would obscure the invention due to unnecessary detail.

Throughout the specification, when an element is referred to as 'including' or 'having' another element, it should be understood that the element may further include other elements unless stated otherwise. As used herein, the term "calibration network" refers to a radio-frequency (RF) circuit providing a path in which transmission signals obtained via a bidirectional coupler, which is coupled to an output terminal in each of transmission paths, in units of transmission paths are fed back to a calibration processor and a path in which a pilot signal is transmitted to an input terminal in each reception path from the calibration processor.

FIG. 1 is a perspective view of an example of an external shape of an antenna device having an antenna assembly therein, according to the present invention. An antenna device 10 largely includes a housing 12 having a heat sink and a radome 11 coupled to the housing 12. An antenna assembly which will be described below is embedded between the housing 12 and the radome 11. A power supply unit (PSU) 13 is coupled to the bottom of the housing 11, for example, via a locking mechanism, and supplies power to operate electronic components included in the antenna assembly.

Massive MIMO Antenna Assembly Having Stacked Structure

Figure 2:
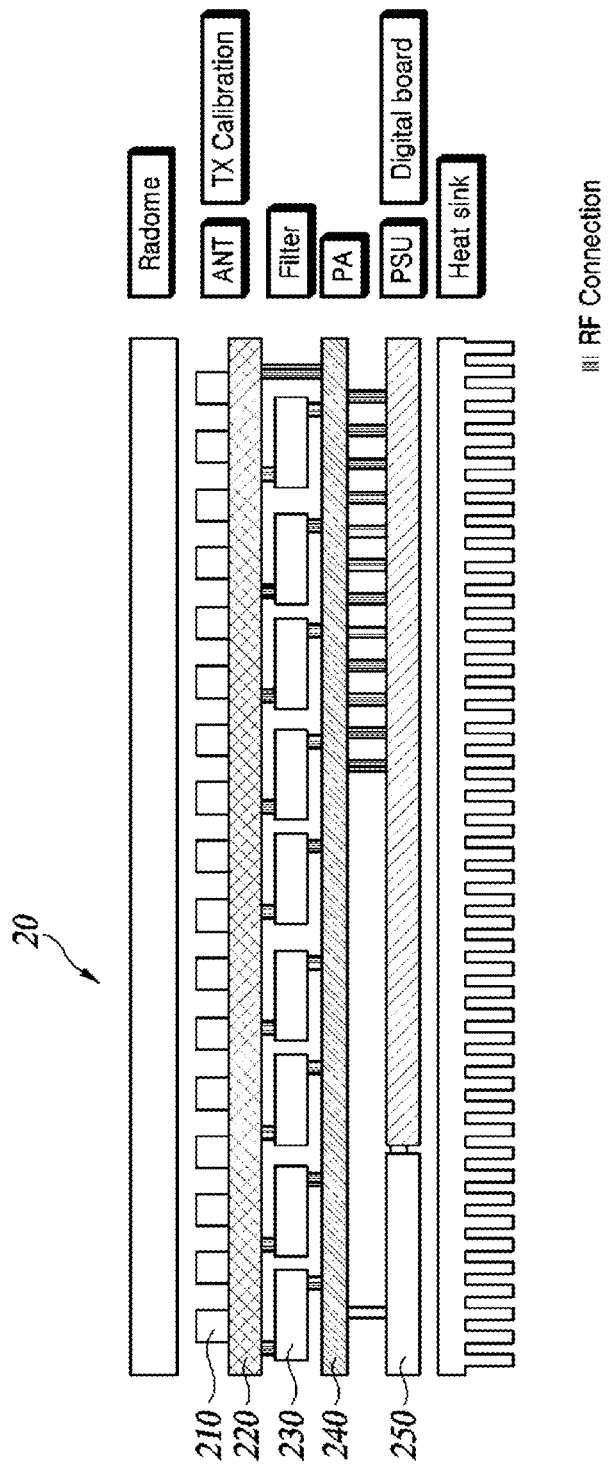
FIG. 2 is a diagram illustrating an example of a stacked structure of a massive multiple-input multiple-output (MIMO) antenna.

FIG. 2 is a diagram illustrating an example of a stacked structure of a massive multiple-input multiple-output (MIMO) antenna.

A Massive MIMO antenna 20 illustrated in FIG. 2 includes a radome, a housing having a heat sink at an outer side thereof, and an antenna assembly arranged between the radome and the housing. The antenna assembly includes a stacked structure of modules on which RF elements and digital elements are provided. Major modules of the antenna assembly illustrated herein may be broadly divided into six layers.

A first layer includes a printed circuit board (PCB) 220 on which a calibration network is provided, and a plurality of antenna elements 210 on the PCB 220. A second layer includes a plurality of filters 230, and the plurality of filters 230 are electrically connected to signal lines of an RF feeding network on the first layer via an RF interface such as an RF connector.

A third layer includes a PCB 240 on which an analog processing circuit such as a power amplifier (PA) is provided. Power amplifiers included in the analog processing circuit are electrically connected to the corresponding filters 230 on the second layer via the RF interface. In addition, the analog processing circuit is connected to the calibration network via the RF interface.

A fourth layer includes a digital board 250 on which a digital processing circuit is provided, and a power supply unit (PSU) 250. The digital board 250 converts a digital signal received from a base band unit (BBU) of a base station into an analog RF signal, and converts an analog RF signal received via an antenna into a digital signal and transmits the digital signal to the BBU of the base station. The digital board 250 is connected to the PCB 240 on which the analog processing circuit on the third layer is provided, via the RF interface.

Figure 3:
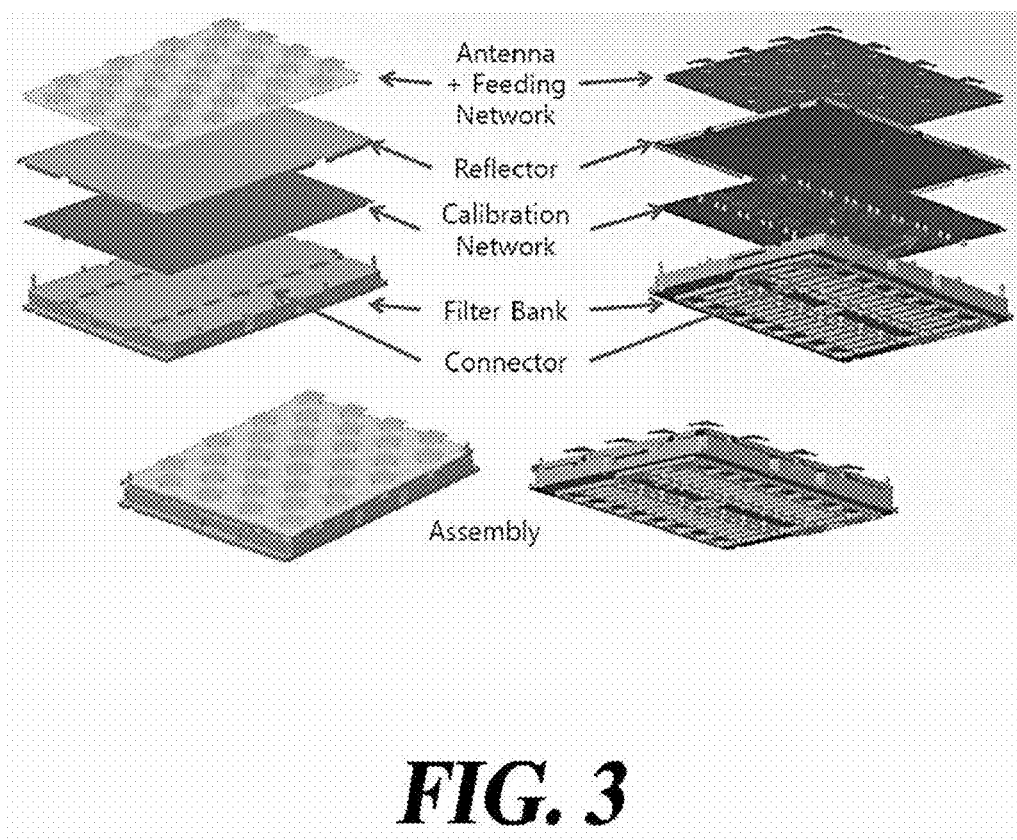
FIG. 3 is an exploded view of an example of a sub-assembly including a first layer and a second layer of the stacked structure of FIG. 2 are provided.

FIG. 3 is an exploded view of an example of a sub-assembly including an implementation of the first layer and the second layer of the stacked structure of FIG. 2.

As illustrated in FIG. 3, a plurality of sublayers corresponding to the first layer and a filter bank corresponding to the second layer are combined to form a sub-assembly of an antenna assembly. A first sublayer includes a PCB on which an RF feeding network is provided, and a plurality of antenna elements on the PCB. A second sublayer includes a reflector, and a third sublayer includes a PCB on which a calibration network is provided. The first to third sublayers of the first layer may be embodied as a multilayer PCB. In particular, referring to FIG. 2, a filter bank including a plurality of filters therein is fastened with the sublayers. The filter bank is a structure for securing blind mating connection of the plurality of filters and a clamping force, and inevitably increases a size of the sub-assembly.

In each of the stacked structures of FIGS. 2 and 3, the calibration network is located between the antenna and the filters. Generally, the calibration network includes a plurality of switches and is connected to RF couplers coupled to rear ends of the filters. Thus, the feeding network and the filters should be connected via an RF connector (e.g., a standard RF interface such as a coaxial connector). Because an analog board with a power amplifier and a digital board are configured as separate layers, an RF connector is also used as an RF interface between the analog board and the digital board. As described above, a MIMO antenna system as illustrated in FIGS. 2 and 3 includes a plurality of layers and the plurality of layers are connected via an RF connector, thereby preventing reduction in the weight and size of the MMO antenna system.

The present invention suggests a massive MIMO antenna system having a slimmer and more compact stacked structure.

Figure 4:
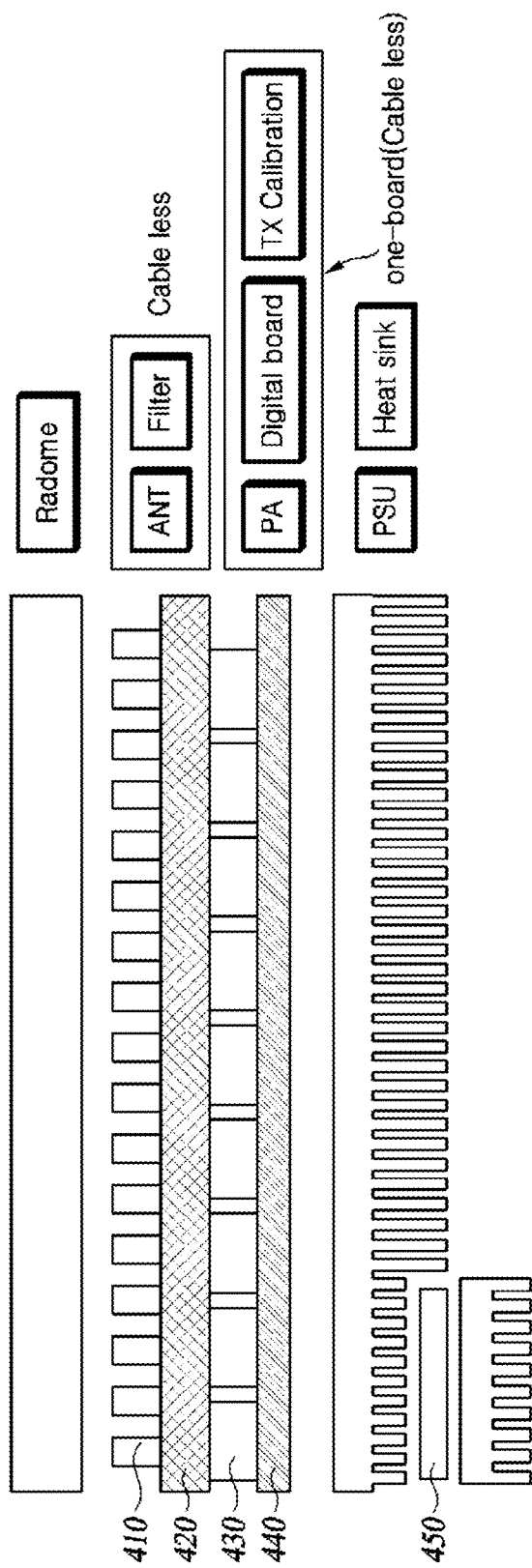
FIG. 4 is a diagram illustrating a stacked structure of a massive MIMO antenna system according to an embodiment of the present invention.
Figure 5:
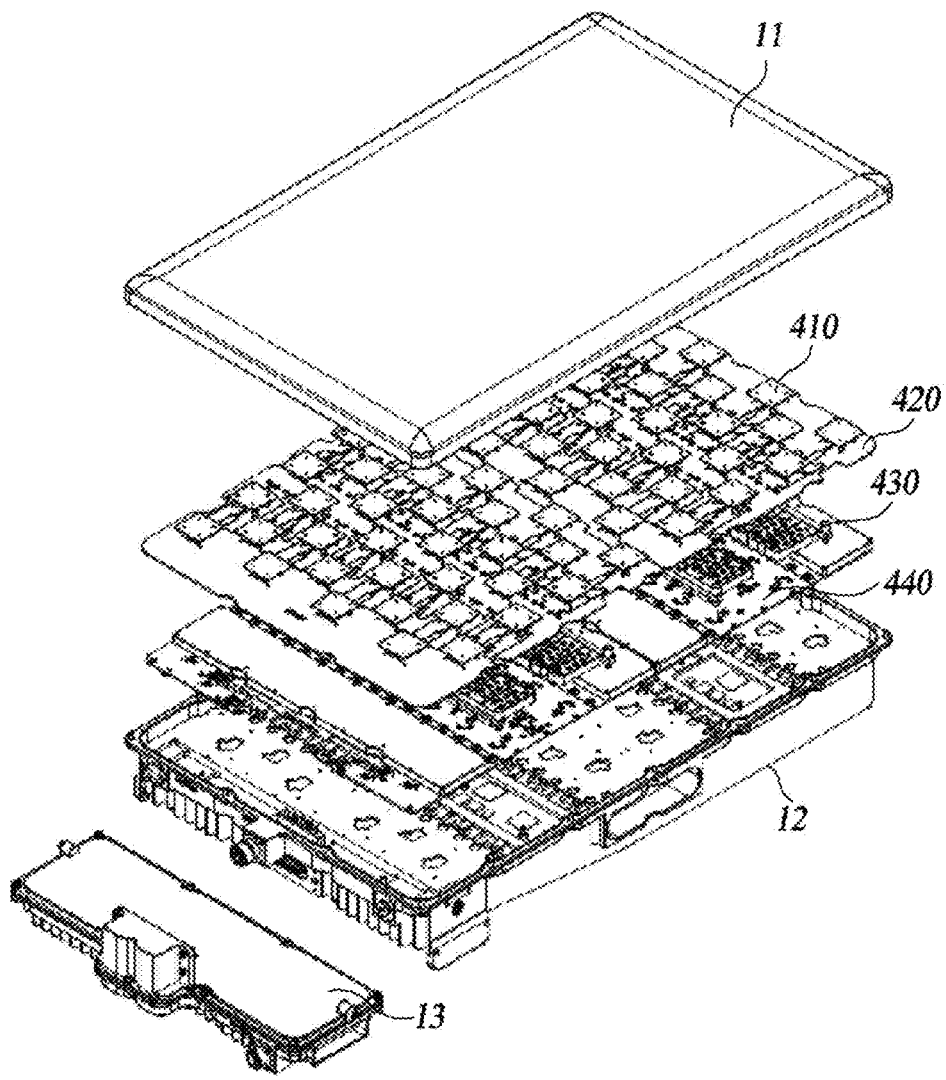
FIG. 5 is an exploded view of a massive MIMO antenna employing the stacked structure of FIG. 4, according to an embodiment of the present invention.
Figure 6:
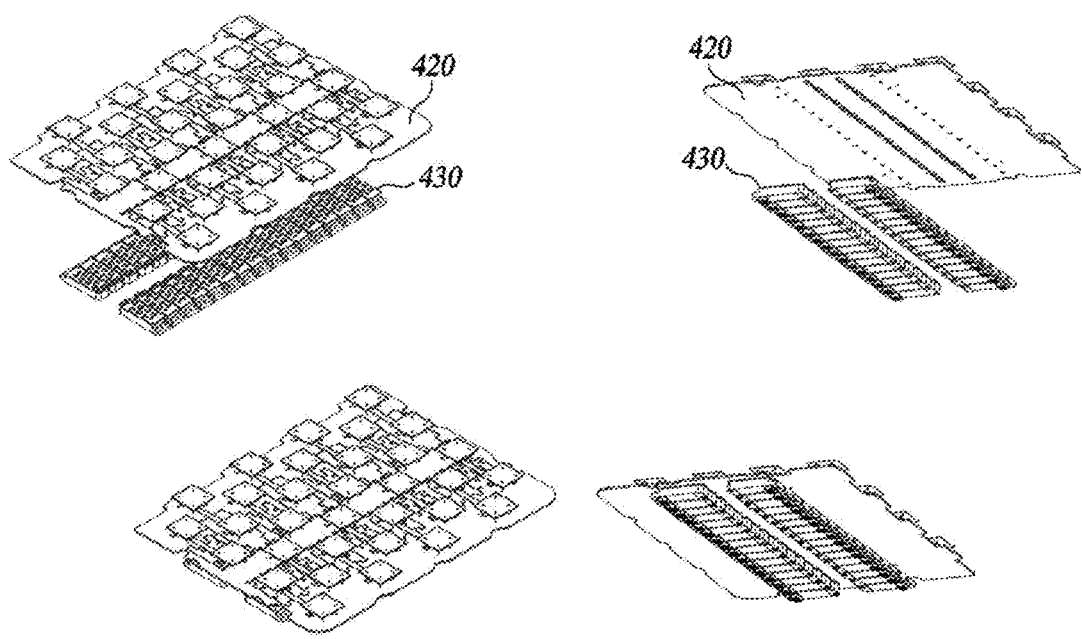
FIG. 6 is an exploded view of a sub-assembly in which filters are coupled to a first printed circuit board (PCB) coupled with an antenna element, according to an embodiment of the present invention.

FIG. 4 is a diagram illustrating a stacked structure of a massive MIMO antenna system according to an embodiment of the present invention. FIG. 5 is an exploded view of a massive MIMO antenna employing the stacked structure of FIG. 4, according to an embodiment of the present invention. FIG. 6 is an exploded view of a sub-assembly in which filters are coupled to a first PCB coupled with an antenna element, according to an embodiment of the present invention.

As will be described below, according to the present invention, calibration is performed not on a front end of an antenna element 410, but on a front end of a filter 430 (i.e., an output terminal of a power amplifier). A phase deviation caused by filters and an antenna feeder line may be managed at an acceptable level by producing or using filters with a fixed phase deviation. By performing calibration at the output terminal of the power amplifier, a calibration network, which was provided between an antenna element and a filter in the related art, may be provided on one board, together with a power amplifier and a digital circuit, and filters may be closely coupled to the bottom of a PCB on which a feeding network is provided. In other words, the present invention employs a strategy in which an antenna assembly is reduced to a compact size while managing the phase deviation caused by the filter and antenna feeder line at an acceptable level.

As illustrated in FIG. 4, in a stacked structure according to an embodiment of the present invention, a calibration network is provided on one board 440, together with a power amplifier and a digital circuit. Thus, it is not necessary to connect the power amplifier, the calibration network, and the digital circuit via an RF cable. Furthermore, the stacked structure of FIG. 4 includes a smaller number of layers than that of FIG. 2.

A MIMO antenna assembly according to the present embodiment includes a first PCB 420 and a second PCB 440. An RF feeding network is provided on the first PCB 420. A plurality of antenna elements 410 are coupled to an upper surface of the first PCB 420 to be electrically connected to the RF feeding network, and a plurality of band-pass filters 430 are closely coupled to a lower surface of the first PCB 420 to be electrically connected to the RF feeding network. At least one ground plane is provided on the first PCB 420, and may function as a reflector for the plurality of antenna elements 410. That is, the at least one ground plane on the first PCB 420 is used as a reflector and thus the reflector illustrated in FIG. 3 may be omitted. A digital processing circuit configured to perform baseband processing, an analog processing circuit providing a plurality of transmitting/receiving (TX/RX) circuits, and a calibration network are provided on the second PCB 440. The band-pass filters 430 are electrically connected to signal lines of the first PCB 420 and the second PCB 440.

A structure of fastening band-pass filters and PCBs will now be described. The present invention suggests a new structure of fastening filters and PCBs, which is improved in terms of size and assemblability. The present invention also suggests a fastening structure capable of uniformly applying a clamping force to secure electrical characteristics of a plurality of filters, thereby minimizing the amount of cumulative assembly tolerances occurring during assembly of the plurality of filters.

Figure 7:
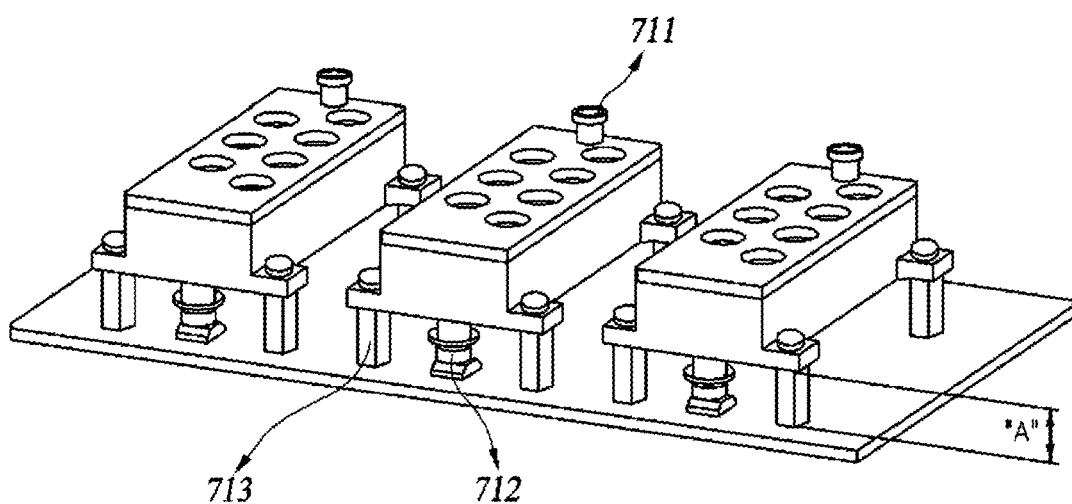
FIG. 7 is a diagram illustrating an example of a structure in which a band-pass filter is coupled to a PCB via an RF connector.

First, a fastening structure of the related art will be described with reference to FIG. 7 below. FIG. 7 is a diagram illustrating an example of a structure in which a band-pass filter is coupled to a PCB via an RF connector. Generally, an RF connector which is of a blind mating connector type is used to fasten a band-pass filter to a PCB. FIG. 7 illustrates cavity filters each having RF connectors 711 and 712 respectively provided on an upper surface and a lower surface thereof. An RF connector (a male connector) to be inserted into an RF connector (a female connector) provided at the bottom of the cavity filter is surface-mounted on a PCB. Each of the cavity filters is individually fastened to the PCB via a fastening structure 713.

In the structure of FIG. 7, the cavity filters are individually fastened to the PCB and thus assembly tolerance may occur in RF characteristics due to different clamping forces applied between the cavity filters. Furthermore, the cavity filters are spaced apart from the PCB by a length A of the fastening structure 713 set in consideration of the length of the RF connectors when coupled to each other, thereby inevitably increasing the size of the structure. In particular, in order to apply blind mating connection to both upper and lower surfaces of the cavity filters, a very complicated hardware structure (e.g., a structure in which a filter is embedded in a separate assembly case, such as the filter bank illustrated in FIG. 3) is necessary.

RF Interface Between PCBs and Filters

Figure 8:
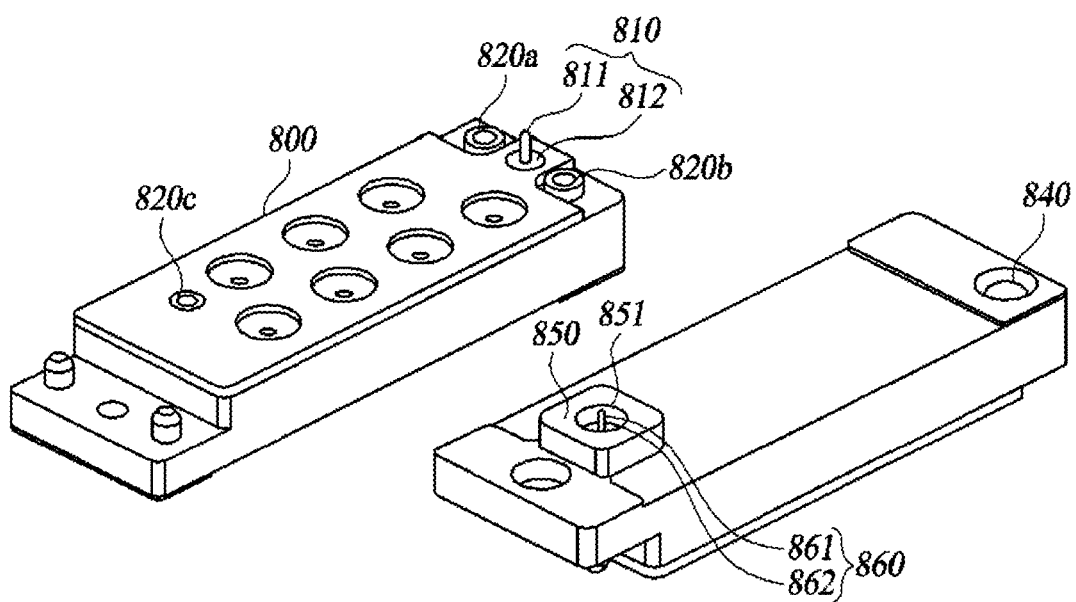
FIG. 8 is a perspective view of a structure of a cavity filter according to the present invention.
Figure 9:
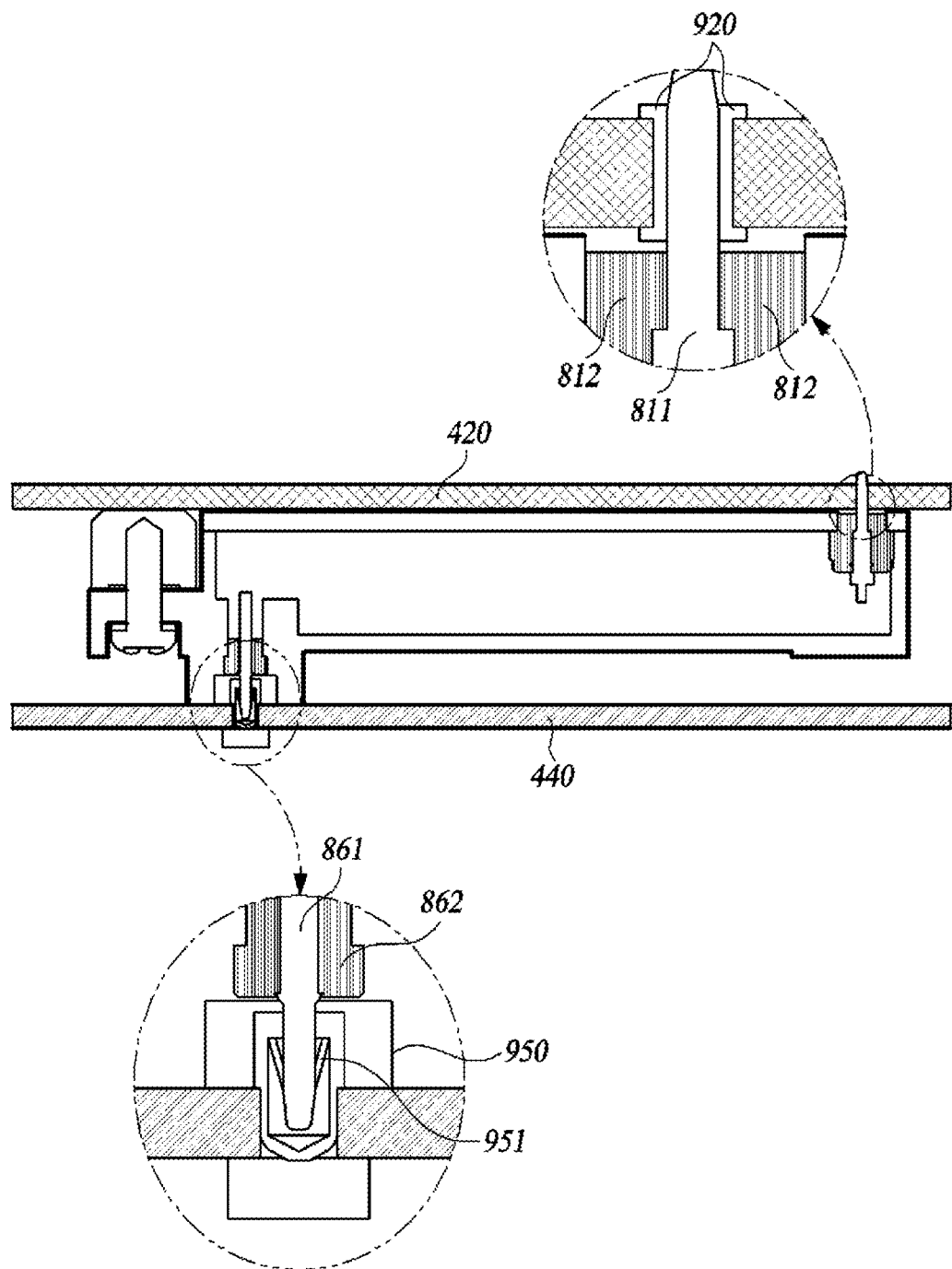
FIG. 9 is a cross-sectional view of a structure in which a cavity filter is coupled to a first PCB and a second PCB, according to an embodiment of the present invention.

FIG. 8 is a perspective view of a structure of a cavity filter according to the present invention. FIG. 9 is a cross-sectional view of a structure in which a cavity filter is coupled to a first PCB and a second PCB, according to an embodiment of the present invention. In FIG. 9, internal components of the cavity filter are not illustrated to avoid confusion.

As illustrated in FIG. 8, a cavity filter includes a first input/output (I/O) port 810 and a second I/O port 860. The first I/O port 810 is provided on an upper surface (e.g., a cover) of the cavity filter, and the second I/O port 860 is provided on a lower surface of the cavity filter. The I/O ports 810 and 860 are configured as pin structures and are different from a standard RF interface such as a coaxial connector.

Referring to FIG. 8, the first I/O port 810 is a pin structure configured to be inserted into an opening section of the upper surface of the cavity filter. The pin structure includes a conductive pin 811 and an insulating bush 812. The conductive pin 811 passes through the insulating bush 812 to protrude from the insulating bush 812. The pin structure air-tightly closes the opening section when inserted into the opening section. A portion of the conductive pin 811 protrudes from the upper surface of the cavity filter. A plurality of fastening grooves 820a to 820c to be fastened with a first PCB via bolts are formed in the upper surface of the cavity filter.

As illustrated in FIG. 9, the cavity filter is closely coupled to a lower surface of a first PCB 420 on which a feeding network is provided. A plurality of plated through-holes 920 connected to the feeding network are formed on the first PCB 420. The cavity filter is closely coupled to the lower surface of the first PCB 420 such that a portion of the conductive pin 811 is inserted into the through-hole 920 of the first PCB 420. Portions of the conductive pin 811 and the through-hole 920 which are in contact with each other may be soldered.

Because a large number of RF integrated circuits (ICs) or digital ICs are mounted on a second PCB 440, the cavity filter should be coupled to an upper surface of the second PCB 440 while being spaced a certain distance from the second PCB 440 so as to prevent damage to the mounted ICs. Referring back to FIG. 8, an opening section is formed in a protruding part 850 protruding from the lower surface of the cavity filter in a height direction of the cavity filter. The pin structure 860, which is a combination of a conductive pin 861 and a bush 862, is inserted into an opening section of the protruding part 850 to air-tightly close the opening section. The protruding part 850 having the opening section is provided with an insertion part 851 configured to accommodate a socket 950 mounted on the second PCB 440, which will be described below. In addition, a fastening groove 840 is formed at the lower surface of the cavity filter to be fastened with the structure on the second PCB 440 via a bolt.

Referring to FIG. 9, the cavity filter is coupled to the upper surface of the second PCB 440 on which the RF circuits are formed. The socket 950 is surface-mounted on the upper surface of the second PCB 440. The socket 950 includes a hole into which the conductive pin 861 of the cavity filter is inserted, and at least one contact pin 951 configured to be in electrical contact with the conductive pin 861 inserted into the hole. When the socket 950 is accommodated in the insertion part 851 of the cavity filter, the conductive pin 861 is inserted into the hole of the socket 950. The cavity filter and the upper surface of the second PCB 440 are spaced apart from each other by a height of the protruding part 850 protruding from the lower surface of the cavity filter. The height of the protruding part 850 is designed in consideration of the sizes of the elements mounted on the upper surface of the second PCB 440, and thus, the distance between the cavity filter and the second PCB 440 is far less than that in the structure of FIG. 7 using the RF connectors.

Figure 10:
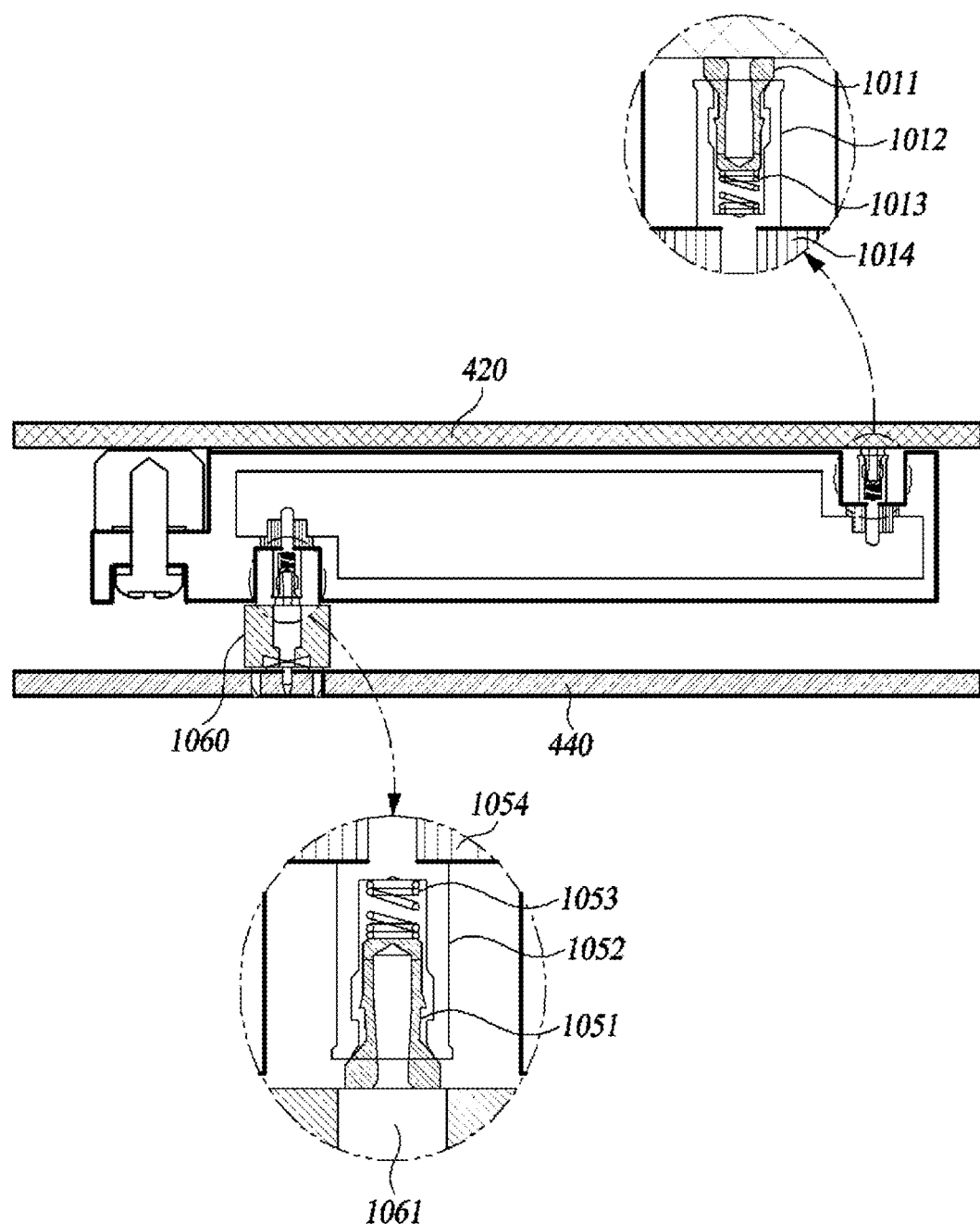
FIG. 10 is a cross-sectional view of a structure in which a cavity filter is coupled to a first PCB and a second PCB, according to another embodiment of the present invention.

FIG. 10 is a cross-sectional view of a structure in which a cavity filter is coupled to a first PCB and a second PCB, according to another embodiment of the present invention. In FIG. 10, internal components of the cavity filter are not illustrated to avoid confusion.

Referring to FIG. 10, a first I/O port is configured as a pin structure to be inserted into an opening section formed in an upper surface of the cavity filter. The pin structure includes a spring pin connector and an insulating bush 1014. The spring pin connector includes a conductive cylindrical barrel 1012 passing through the insulating bush 1014 to protrude from the insulating bush 1014, a conductive plunger 1011, at least a portion of which is inserted into the barrel 1012, and a spring 1013 provided in the barrel 1012 to support the plunger 1011. The pin structure is inserted into the opening section to air-tightly close the opening section. A portion of the plunger 1011 protrudes from the upper surface of the cavity filter, and is configured to be pushed into the cylindrical barrel 1012 by pressure applied thereto (e.g., when pressed against a first PCB 420).

The cavity filter is closely coupled to a lower surface of the first PCB 420 on which the feeding network is provided. A plurality of contact pads (not shown) connected to the feeding network are formed on the first PCB 420. The cavity filter is closely fastened to a lower surface of the first PCB 420 such that a head of the plunger 1011 is in contact with the contact pads on the first PCB 420. A portion of the plunger 1011 is pushed into the cylindrical barrel 1012 when the upper surface of the cavity filter is in close contact with the first PCB 420. The spring 1013 inside the barrel 1012 applies appropriate contact pressure between the head of the plunger 1011 and the contact pads.

Similar to the first I/O port, a second I/O port is configured as a pin structure to be inserted into the opening section formed in the upper surface of the cavity filter. The pin structure includes a spring pin connector and an insulating bush 1054. The spring pin connector includes a cylindrical barrel 1052 passing through the insulating bush 1054 to protrude from the insulating bush 1054, a plunger 1051, at least a portion of which is inserted into the barrel 1052, and a spring 1053 provided in the barrel 1052 to support the plunger 1051.

A socket 1060 is surface-mounted on an upper surface of a second PCB 440. A contact pad 1061 electrically connected to a transmitting/receiving circuit is provided on an upper surface of the socket 1060. The cavity filter is coupled to the second PCB 440 such that a head of the plunger 1051 of the second I/O port is in contact with the contact pad 1061 on the second PCB 440. In the embodiment of FIG. 10, the cavity filter and the upper surface of the second PCB 440 are spaced apart from each other by a height of the socket 1060 mounted on the second PCB 440. In other embodiments, similar to the embodiments of FIGS. 8 and 9, a protruding part may protrude from the lower surface of the cavity filter in a height direction of the cavity filter, and the spring pin connector may be provided in an opening section formed in the protruding part. At least a portion of the socket 1060 mounted on the second PCB 440 may be inserted into the opening section of the protruding part.

Figure 11:
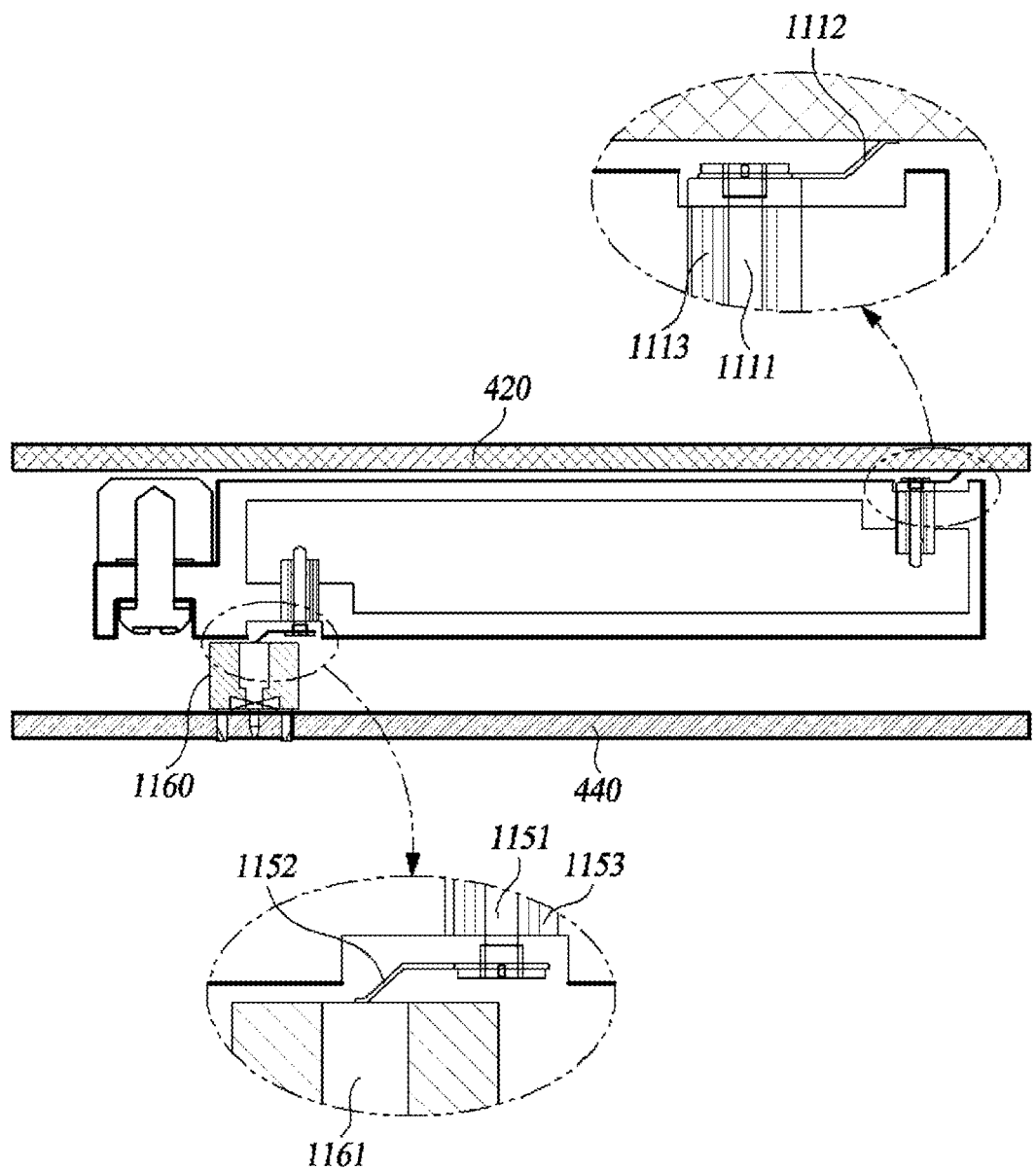
FIG. 11 is a cross-sectional view of a structure in which a cavity filter is coupled to a first PCB and a second PCB, according to another embodiment of the present invention.

FIG. 11 is a cross-sectional view of a structure in which a cavity filter is coupled to a first PCB and a second PCB, according to another embodiment of the present invention. In FIG. 11, internal components of the cavity filter are not illustrated to avoid confusion.

Referring to FIG. 11, a first I/O port is configured as a pin structure to be inserted into an opening section formed in an upper surface of the cavity filter. The pin structure includes an insulating bush 1113, a conductive pin 1111 passing through the insulating bush 1113 to protrude from the insulating bush 1113, and a conductive rod 1112 fixed on an end of the conductive pin 1111 in a vertical direction. The conductive rod 1112 is bent such that an end thereof protrudes from the upper surface of the cavity filter. The cavity filter is closely coupled to a first PCB 420 on which a feeding network is provided. Similar to the embodiment of FIG. 10, a plurality of contact pads (not shown) connected to the feeding network is provided on the first PCB 420. The cavity filter is fastened to a lower surface of the first PCB 420 such that an end of the conductive rod 1052 is in contact with the contact pads on the first PCB 420. The conductive rod 1112 is bent toward the bottom of the cavity filter when the upper surface of the cavity filter is in close contact with the first PCB 420. The conductive rod 1112 preferably has elasticity to apply contact pressure to the contact pads.

Similar to the first I/O port, the second I/O port is configured as a pin structure to be inserted into the opening section formed in the upper surface of the cavity filter. The pin structure includes an insulating bush 1153 inserted into the opening section, a conductive pin 1151 passing through the insulating bush 1153 to protrude from the insulating bush 1153, and a conductive rod 1152 fixed on an end of the conductive pin 1151 in a vertical direction. A middle portion of the conductive rod 1152 is bent such that an end of the conductive rod 1152 protrudes from a lower surface of the cavity filter.

Similar to the embodiment of FIG. 10, a socket 1160 is surface-mounted on an upper surface of a second PCB 440. A contact pad 1161 electrically connected to a transmitting/receiving circuit is provided on an upper surface of the socket 1160. The cavity filter is combined with the second PCB 440 such that an end of the conductive rod 1152 of the second I/O port is in contact with the contact pad 1161 on the second PCB 440. In the embodiment of the FIG. 11, the cavity filter and the upper surface of the second PCB 440 are spaced apart from each other by a height of the socket 1160 mounted on the second PCB 440. In other embodiments, similar to the embodiments of FIGS. 8 and 9, a protruding part may protrude from the lower surface of the cavity filter in a height direction of the cavity filter, and the pin structure may be provided in an opening section formed in the protruding part. At least a portion of the socket 1160 mounted on the second PCB 440 may be inserted into the opening section of the protruding part.

The structures of the first and second I/O ports of the cavity filters illustrated in FIGS. 9 to 11 may be used in various combinations if necessary. For example, a cavity filter may have a structure of a first I/O port as illustrated in FIG. 9 and a structure of a second I/O port as illustrated in FIG. 10 or 11.

Filter Coupling Using Push Bar

Cavity filters may be individually assembled to the lower surface of the first PCB 420 and the upper surface of the second PCB 440 but a large deviation in RF characteristics may occur due to different clamping forces applied between the cavity filters. The present invention suggests an assembly method of minimizing the amount of cumulative assembly tolerances occurring during the assembly of a plurality of filters, and a structure capable of uniformly transmitting a clamping force necessary to secure electrical characteristics of filters.

Figure 12:
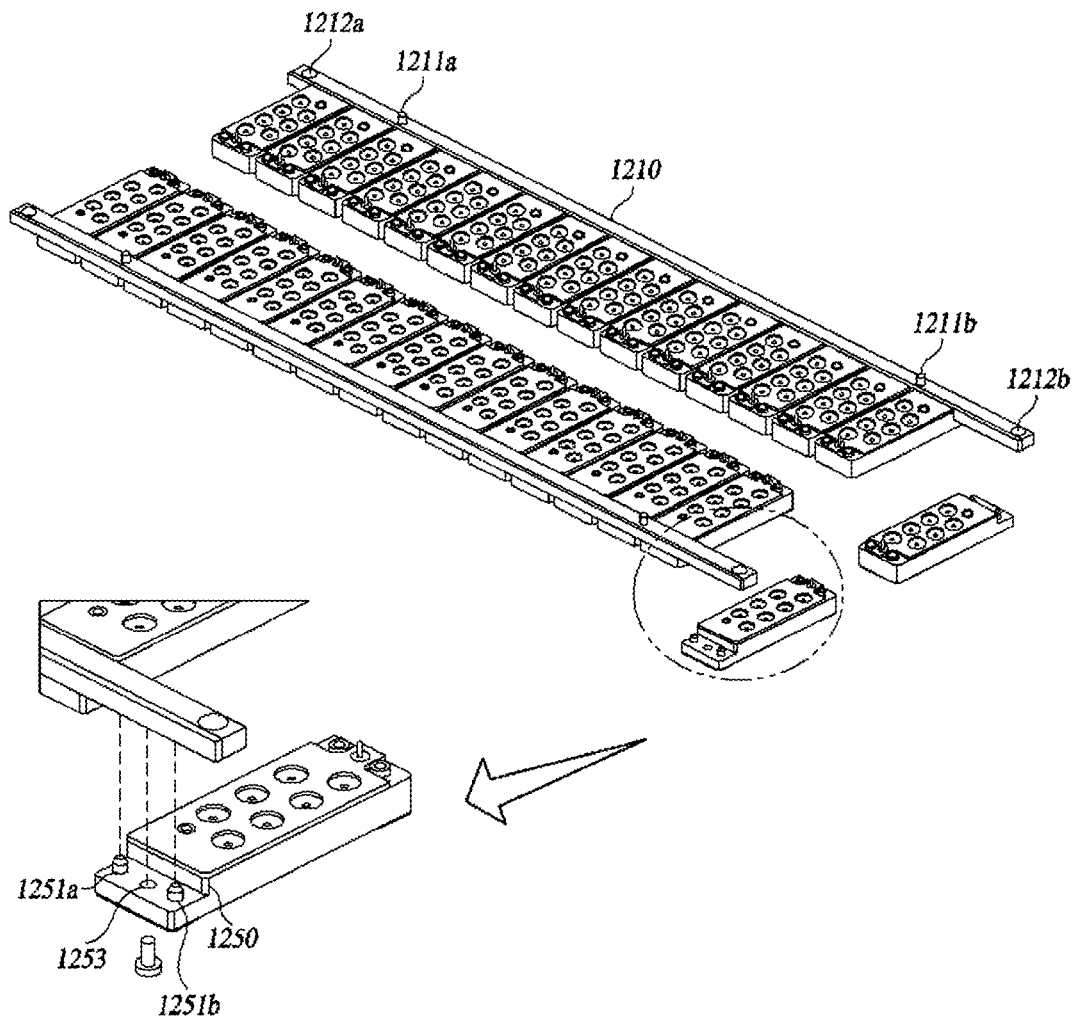
FIG. 12 is a diagram illustrating filter assemblies according to an embodiment of the present invention.
Figure 13:
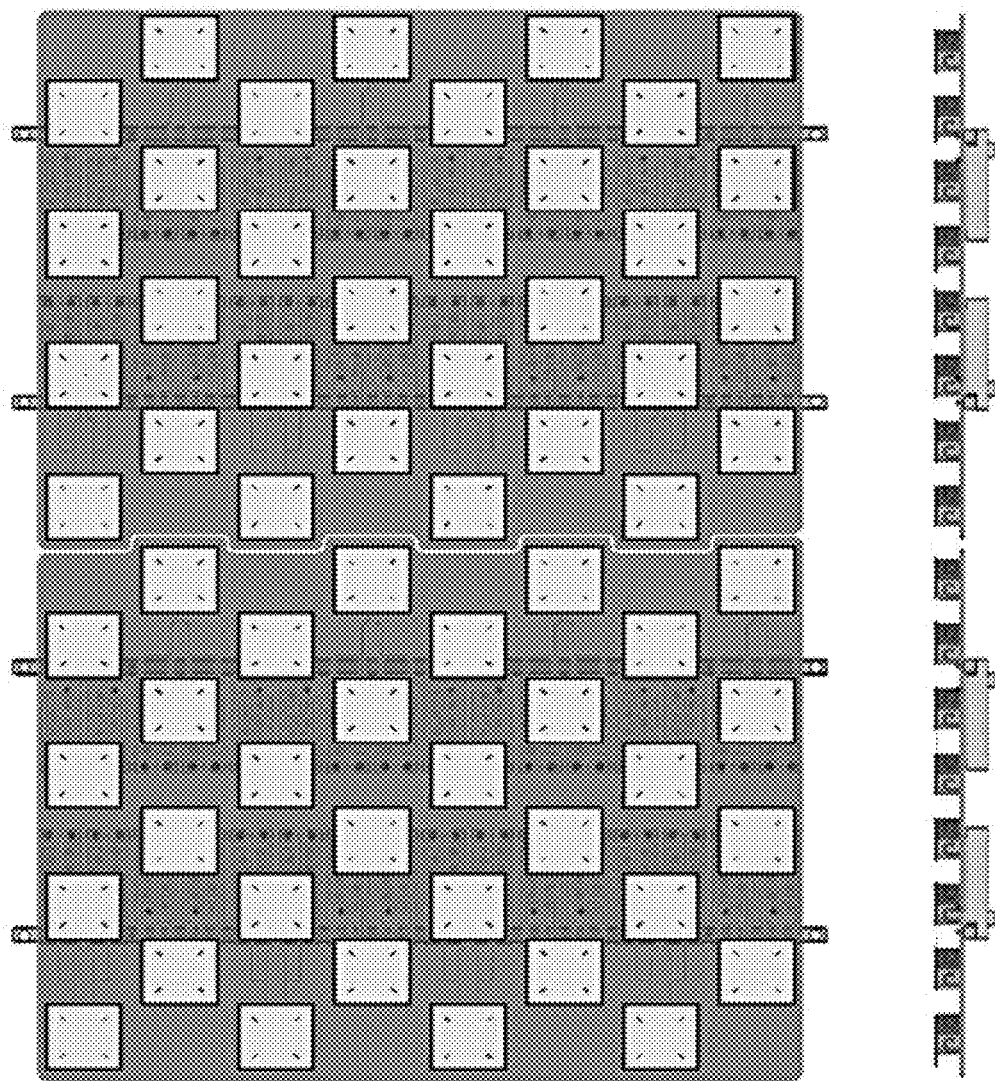
FIG. 13 is a diagram illustrating a state in which filter assemblies are assembled to a first PCB, according to an embodiment of the present invention.

FIG. 12 illustrates filter assemblies according to an embodiment of the present invention, and an enlarged view of a portion of a filter coupled to a push bar. FIG. 13 is a diagram illustrating a state in which filter assemblies are assembled to a first PCB, according to an embodiment of the present invention.

As illustrated in FIG. 12, a filter assembly includes a push bar 1210 and a group of filters assembled in series with the push bar 1210. Each of the filters is provided with a stepped part 1250 to accommodate the push bar 1210. The stepped part 1250 has a shape obtained by cutting a side of the filter at a right angle. The stepped part 1250 is provided with insertion protrusions 1251a and 1251b, and a fastening hole 1253 into which a bolt is inserted. To correspond to the stepped part 1250, the push bar 1210 is provided with insertion grooves (not shown) into which the insertion protrusions 1251a and 1251b of each of the filters are inserted, and a plurality of fastening grooves (not shown) are formed between the insertion grooves to be each fastened with each cavity filter via a bolt.

The push bar 1210 is further provided with two or more insertion protrusions 1211a and 1211b to be inserted into insertion holes (not shown) formed in a first PCB. When the insertion protrusions 1211a and 1211b of the push bar 1210 are inserted into the insertion holes of the first PCB, conductive pins of the group of filters assembled to the push bar 1210 are inserted into through-holes of the first PCB as illustrated in FIG. 10. FIG. 13 illustrates an example of a shape in which four filter assemblies are assembled to a first PCB.

A plurality of fastening holes 1212a and 1212b are formed in opposite ends of the push bar 1210 to be fastened with the components of the second PCB via a bolt. Sockets mounted on the second PCB may be accommodated in insertion holes formed in protruding parts of the group of filters assembled to the push bar 1210, the push bar 1210 is combined with the components of the second PCB via bolts in a state in which a second coaxial pin is inserted into a hole of the socket, and a clamping force may be uniformly provided to the group of filters assembled to the push bar 1210. The push bar 1210 should have a certain degree of rigidity, because it is difficult to transmit a uniform load or fastening force to each of the filters when the push bar 1210 is bent.

As described above, in a method of fastening filters to a PCB using the push bar 1210, the amount of cumulative tolerances occurring during the combining of the filters to the PCB may be minimized, the amount of tolerances may be consistently controlled, and blind mating may be stably performed between an antenna and an RF transmitting/receiving circuit. Furthermore, in order to achieve a clamping force necessary to obtain RF characteristics during the fastening of the filters, no device or assembly structure is not individually required for the filters. When a preassembled "filter assembly" is used in a process of assembling an antenna assembly, the process of assembling the antenna assembly may be simplified.

Furthermore, a coaxial connector or RF cabling is not necessary in a unique structure for electrical connection between filters and PCBs, which is suggested by the present invention. In a unique structure for fastening PCBs and a filter assembly, which is suggested by the present invention, filters are fastened to the PCBs in a lump by using a push bar instead of individually fastening the filters to the PCBs, and thus, an antenna assembly or the filter assembly may be easily separated. Therefore, it is easy to conduct a desired performance test or exchange a defective antenna during the installation or operation of the antenna assembly.

Beamforming Calibration

For beamforming at an antenna, an amplitude and phase of a radio module should be kept constant in each TX path and each RX path but actually, there is a deviation in the amplitude and phase of the radio module in each TX/RX path. A task of compensating for such deviation is called beamforming calibration in the radio module.

The present invention suggests a method of temporally dividing and sharing the same RF path in transmission path calibration (TX calibration) and reception path calibration (RX calibration), based on characteristics of a MIMO antenna system operated by a time division duplex (TDD) scheme.

TX calibration is performed by measuring deviation in RF characteristics (phase/amplitude/delay, etc.) between transmission paths on the basis of a result of a correlation operation performed between a feedback signal captured at a rear end of each of the transmission paths using a self-transmission signal and a transmitted signal and thereafter compensating for the measured deviation. In reception paths, RX calibration is performed by inserting a pilot signal into each of the reception paths, measuring deviation in RF characteristics (phase/amplitude/delay, etc.) on the basis of a result of the correlation operation performed between a signal output from a rear end of each of the reception paths and the pilot signal, and thereafter compensating for the measured deviation. Such a calibration algorithm is substantially the same as those of a method disclosed in Korean Patent Application No. 10-2015-0063177 (publication No. 10-2016-0132166), filed by the present applicant. The contents disclosed in the above Korean patent application are hereby incorporated by reference in their entirety.

An example of a circuit configuration of a massive MIMO antenna assembly and connection of signals therein will be described below with reference to FIGS. 14, 15A, and 15B.

Figure 14:
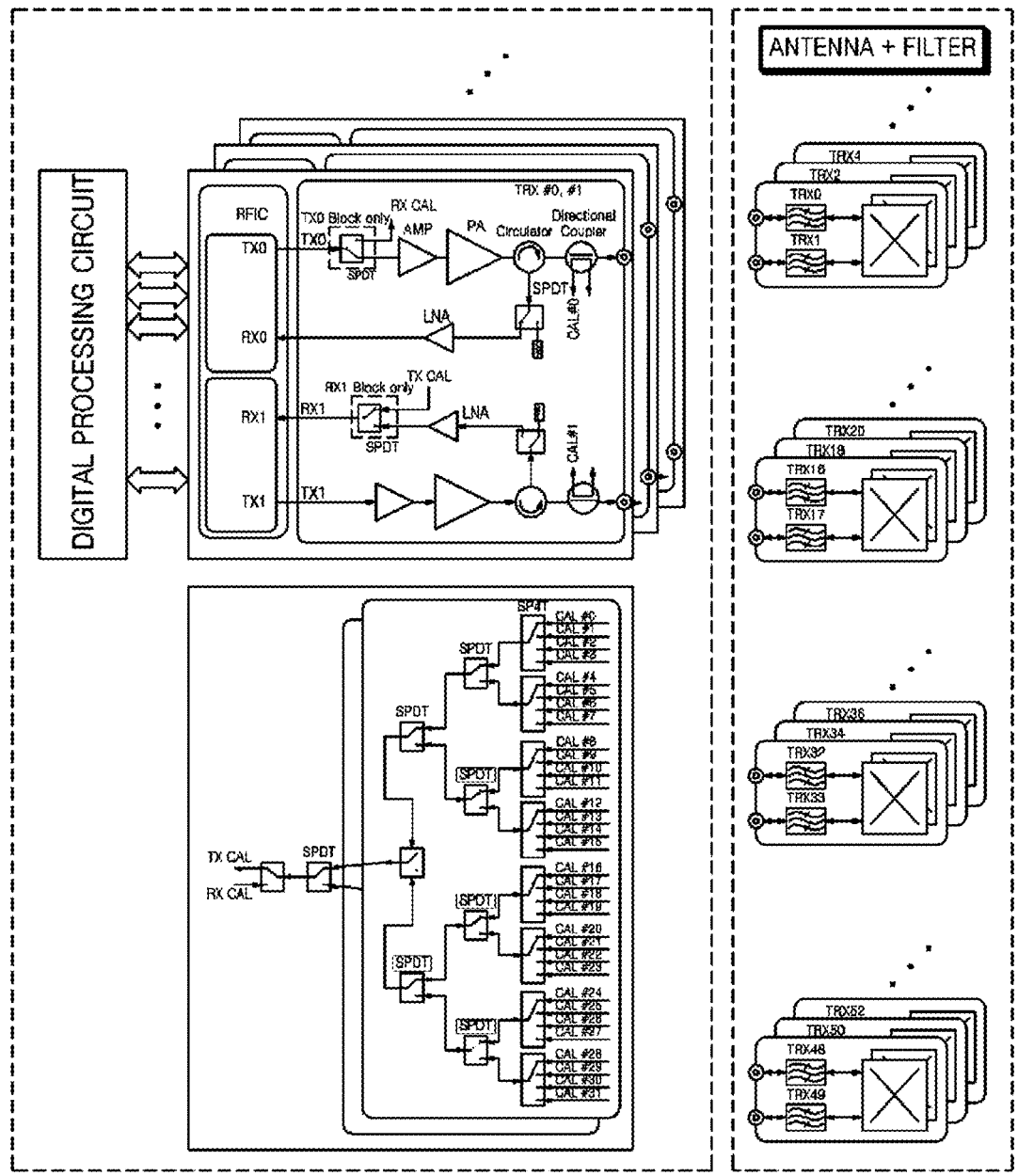
FIG. 14 is a circuit diagram illustrating a function of a massive MIMO antenna assembly according to the present invention.

FIG. 14 is a circuit diagram illustrating a function of a massive MIMO antenna assembly according to the present invention. As illustrated in FIG. 14, a digital processing circuit for performing baseband processing, an analog processing circuit divided into a plurality of transmitting/receiving modules, and a calibration network are provided on a second PCB. Each of the transmitting/receiving modules is connected to a band-pass filter connected to an antenna element via an RF interface. As described above, TX/RX calibration according to an embodiment of the present invention is performed at a front end of a filter. In this method, calibration hardware (H/W) (e.g., a calibration network) may be realized using a free space of the second PCB provided with an RF transmitting/receiving circuit, etc. and the complexity of and connection on the second PCB may be reduced, thereby obtaining a spatial gain and reducing material costs, compared to calibration performed at a front end of an antenna (i.e., a rear end of a filter).

Figure 15A:
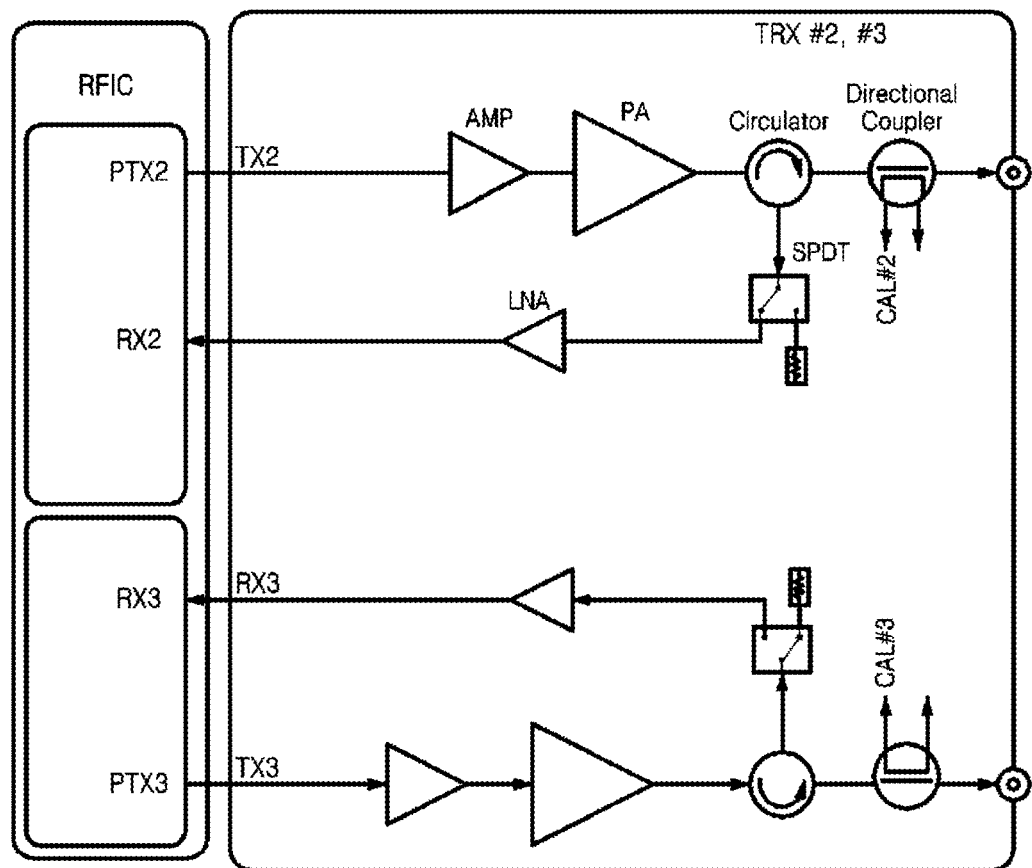
FIG. 15A is a diagram illustrating a transmission/reception module in which no single-pole double-throw (SPDT) switch is present between an RF IC and RF elements.

FIG. 15A is a diagram illustrating a transmission/reception module in which no single-pole double-throw (SPDT) switch is present between an RF IC and RF elements. FIG. 15B is a diagram illustrating a transmitting/receiving module in which an SPDT switch is present between an RF IC and RF elements.

Referring to FIG. 15A, each transmitting/receiving module includes a plurality of RF elements and an RF IC which provide a transmission path and a reception path for a corresponding antenna element.

The RF IC may include an up-converter for up-converting a baseband digital transmission signal received from a digital processing circuit into a transmission frequency, and a digital/analog (D/A) converter for converting the up-converted digital transmission signal into an analog RF transmission signal. The up-converter and the D/A converter form part of the transmission path. The RF IC may further include an analog/digital (A/D) converter for converting an analog RF reception signal into a digital reception signal, and a down-converter for converting the digital reception signal into a baseband digital reception signal. The A/D converter and the down-converter form part of the reception path. The down-converter down-converts a received reception signal into a baseband signal, and the A/D converter converts the baseband signal into a baseband digital signal. The baseband digital signal is transmitted to the digital processing circuit.

Each transmission path further includes a power amplifier (PA), a circulator, and a directional coupler. Each reception path further includes a low-noise amplifier (LNA). A circulator is installed at an interface between each transmission path and each reception path. A reception signal (i.e., an uplink RF signal) input to the circulator from a filter is transmitted to the LNA via the circulator. A transmission signal (a downlink RF signal) input to the circulator from the power amplifier is transmitted to the filter. An SPDT switch functioning as a TDD switch is included between the circulator and the LNA. A terminating resistor is connected to one terminal of the SPDT switch so as to minimize a change in voltage standing wave ratio (VSWR) characteristics. When the transmitting/receiving module operates in a transmission mode (i.e., a downlink time interval), the SPDT switch connects the circulator to the terminating resistor. When the transmitting/receiving module operates in a reception mode (i.e., an uplink time interval), the SPDT switch connects the circulator to the LNA.

Figure 15B:
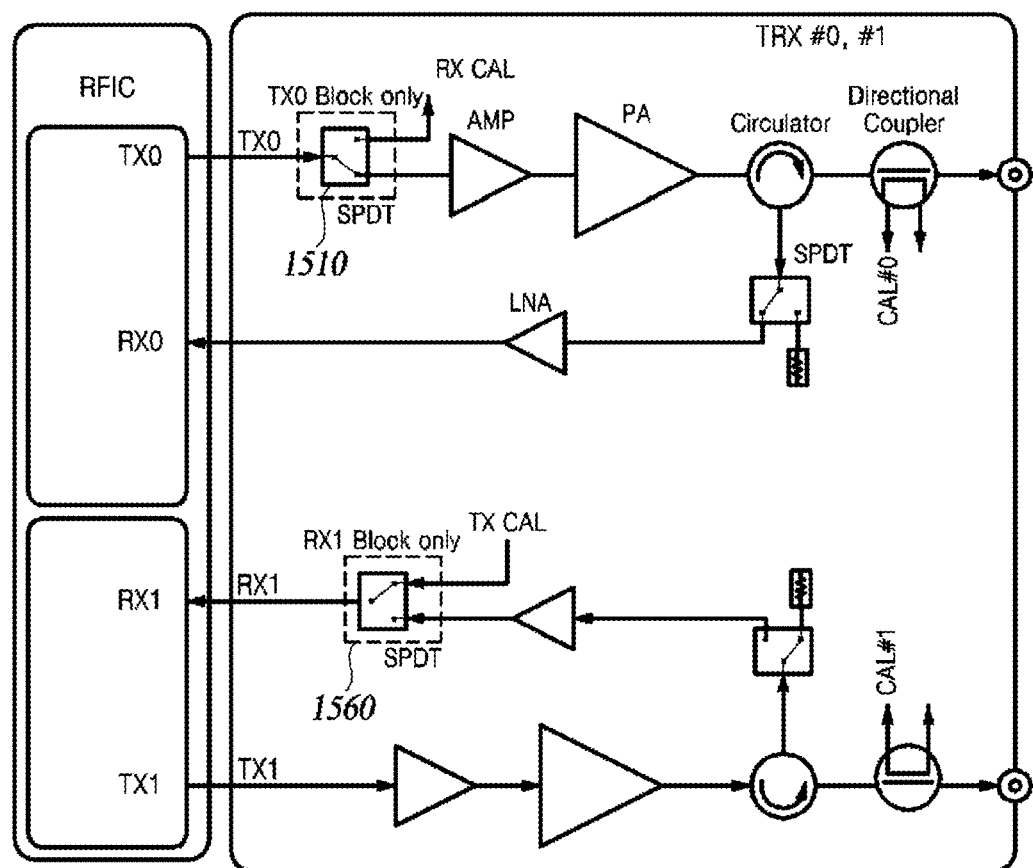
FIG. 15B is a diagram illustrating a transmitting/receiving module in which an SPDT switch is present between an RF IC and RF elements.

As illustrated in FIG. 15B, among transmitting/receiving modules, a transmission path TX0 of a specific transmitting/receiving module, an SPDT switch 1510 is additionally provided at a front end of a power amplifier, unlike in transmission paths of the other transmitting/receiving modules. Similarly, in a reception path RX1 of another specific transmitting/receiving module, a SPDT switch 1560 is additionally provided at a rear end of an LNA, unlike in reception paths of the other transmitting/receiving modules.

A calibration network (which may be referred to as a 'matrix switch') includes a plurality of switches of a tree structure. An uppermost switch (SPDT switch) connected to the SPDT switch 1510 included in the specific transmission path among the plurality of transmission paths and the SPDT switch 1560 included in the other specific reception path among the plurality of reception paths. Lowermost switches (single-pole four-throw (SP4T) switches) are connected to SPDT switches connected to rear ends of the power amplifiers in the transmission paths. Each transmission path and each reception path are selected through selective switching of switches included in the calibration network.

The flow of signals when TX/RX calibration employing the TDD scheme suggested by the present invention is applied will be described in detail below.

TX Calibration

Figure 16:
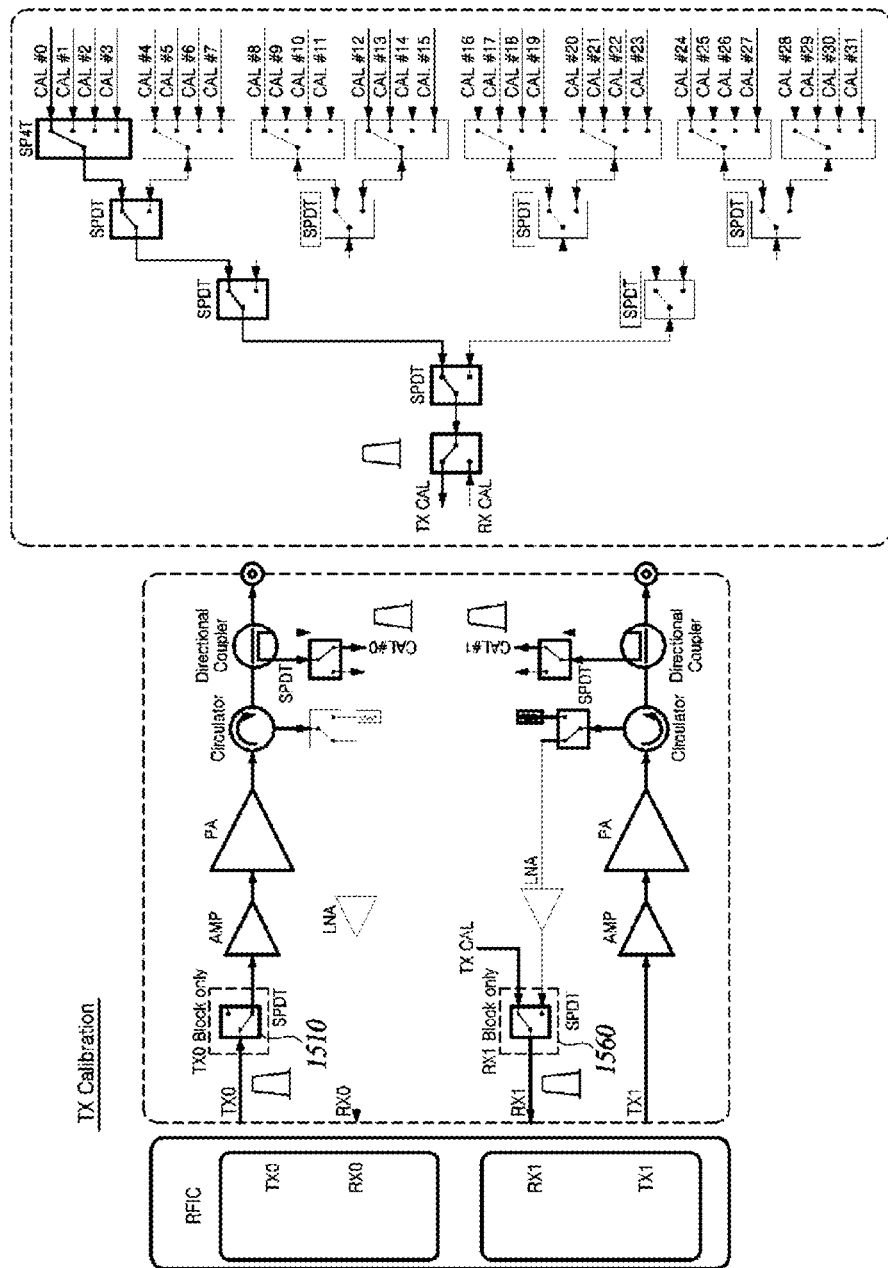
FIG. 16 is a diagram for explaining the flow of signals in the case of transmission (TX) calibration.

FIG. 16 is a diagram for explaining the flow of signals during transmission (TX) calibration.

In FIG. 16, the flow of signals when TX calibration is performed with respect to transmission paths TX0 and TX1 is indicated by a bold line. In FIG. 16, "CAL #0, CAL #1, CAL #2, . . . " refer to transmission signals captured by directional couplers coupled to the rear ends of power amplifiers of respective transmission paths. Similarly, "TX CAL" refers to such a captured transmission signal, but for convenience of explanation, a "captured transmission signal" output from an uppermost switch of a calibration network is indicated by "TX CAL" to explain the flow of signals between a transmitting/receiving circuit and the calibration network and the relation between the transmitting/receiving circuit and the calibration network.

An analog RF signal (i.e., a transmission signal) transmitted from an RF IC to each transmission path is captured by the directional coupler at the rear end of the power amplifier. For example, an analog RF signal transmitted to the transmission path TX0 is captured by the directional coupler, and the captured signal CAL #0 is input to a lowermost switch of the calibration network. At this time, an LNA of a reception path RX1 is off. Similarly, a downlink RF signal transmitted to the transmission path TX1 is captured by the directional coupler at the rear end of the power amplifier and the captured signal CAL #1 is input to the lowermost switch of the calibration network. The captured signal CAL #1 is transmitted to the RF IC via the uppermost switch of the calibration network, e.g., an SPDT switch 1560 on the reception path RX1.

A captured signal is used for calibration by performing the correlation operation on the captured signal and a corresponding original transmission signal after the captured signal passes through an A/D converter and a down-converter, for the reception path RX1, which are included in the RF IC. The details of a TX calibration algorithm are substantially the same as those of the method disclosed in Korean Patent Application No. 10-2015-0063177 (publication No. 10-2016-0132166).

RX Calibration

In the TDD scheme, a reception path should be kept off when a transmission path is on (i.e., in a downlink time interval), RX calibration should be performed when the reception path is on (i.e., in an uplink time interval).

A radio unit (RU) performing the calibration is not given information regarding a reception signal and thus a method of inserting a pilot signal is used to identify RF characteristics such as delay, phase, gain, etc. of reception paths. The pilot signal may be inserted into an RX band (in-band) or an out-of-band. However, it is more appropriate to insert the pilot signal into the in-band in order to accurately identify an amplitude and phase in real time even during reception of a main signal of each reception path. Here, the insertion of the pilot signal into the in-band should be understood to mean that the pilot signal is inserted into a part of a frequency band, which is allowed to receive an unlink RF signal, other than a band actually used to transmit or receive the uplink RF signal.

The inserted pilot signal is removed in a digital domain by a digital filter and thus does not affect the performance of a receiving modem. In the case of a Massive MIMO antenna system of the present invention, a pilot signal is inserted into an output terminal of an RX filter. When the pilot signal is removed by the RX filter, radiation of the pilot signal may be prevented due to an antenna element. Accordingly, on-service calibration may be performed, that is, calibration may be performed in real time during operation of the antenna system.

Figure 17:
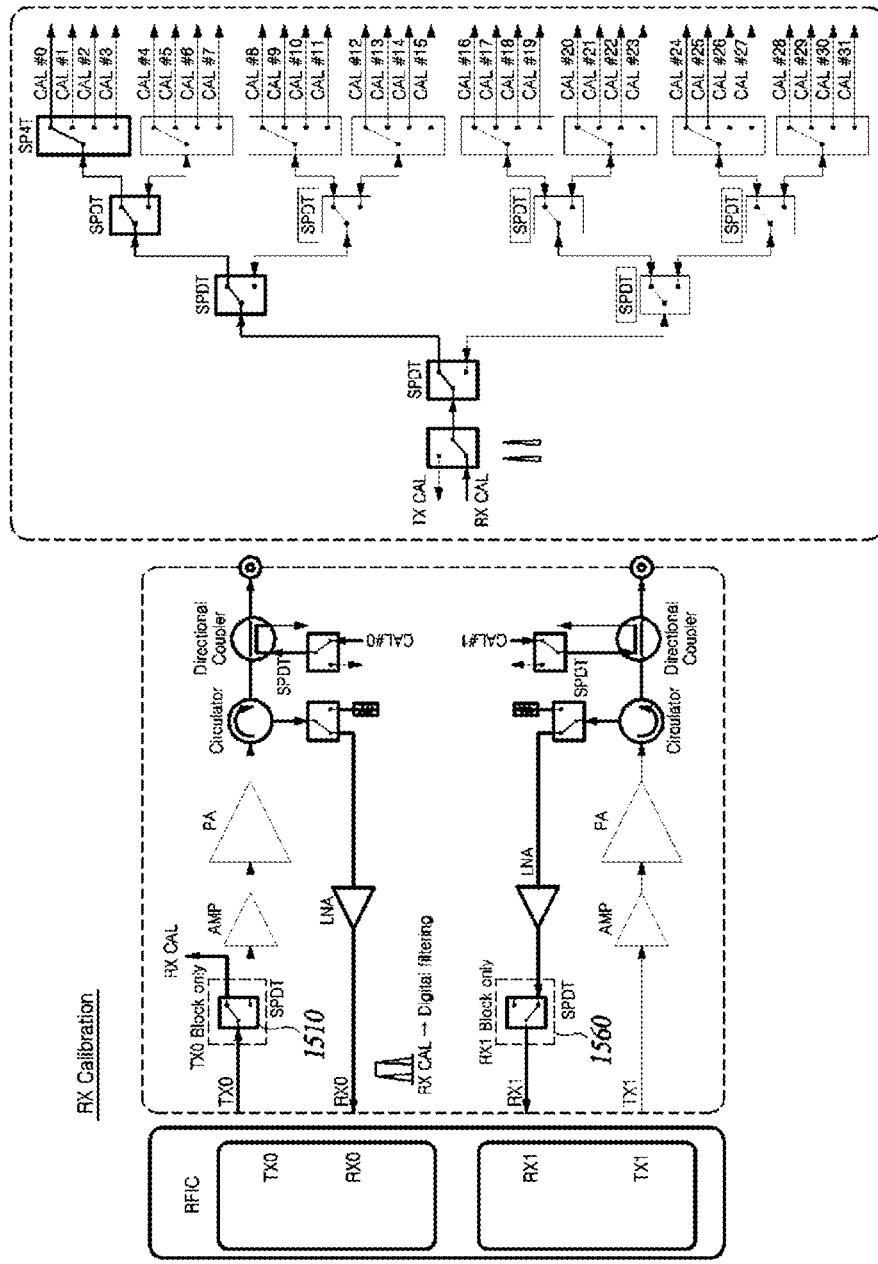
FIG. 17 is a diagram for explaining the flow of signals in the case of reception (RX) calibration.

FIG. 17 is a diagram for explaining the flow of signals during reception calibration.

In FIG. 17, the flow of signals when RX calibration is performed with respect to reception paths RX0 and RX1 is indicated by a bold line. In FIG. 17, RX CAL, CAL #0, CAL #1, CAL #2, . . . all refer to pilot signals used for RX calibration. However, in order to explain the flow of signals between a transmitting/receiving circuit and a calibration network and the relation between the transmitting/receiving circuit and the calibration network, a pilot signal transmitted from an RF IC to the transmitting/receiving circuit is indicated by "RX CAL" and pilot signals output from lowermost switches of the calibration network are indicated by "CAL #0, CAL #1, CAL #2, . . . " for convenience of explanation.

Referring to FIG. 17, the pilot signal "RX CAL" used to correct each reception path is input from the RF IC to a specific transmission path TX0. The pilot signal "RX CAL" input to the specific transmission path TX0 is transmitted to an uppermost switch of the calibration network via an SPDT switch 1360 located at a front end of a power amplifier. A reception path into which the pilot signal is to be inserted is selected by switches included in the calibration network. The pilot signal is inserted into a reception path, via which a reception signal is being transmitted, by a directional coupler located on the selected reception path and is finally transmitted to an RF IC corresponding to the selected reception path. For example, in the case of a reception path RX0, the pilot signal "CAL #0" is transmitted to the RF IC via a circulator, an SPDT switch, and an LNA, together with the reception signal. In the case of a reception path RX1, the pilot signal "CAL #1" is transmitted to the RF IC via the circulator, the SPDT switch, and the LNA, together with the reception signal.

A pilot signal passes through an A/D converter and a down-converter, of each RF IC, for a corresponding reception path, together with a reception signal, and is thereafter separated from the reception signal by a digital filter. The pilot signal separated from the reception signal is used for calibration after performing the correlation operation thereon with the pilot signal "RX CAL" input to the specific transmission path TX0. Details of an RX calibration algorithm are substantially the same as those of the method disclosed in Korean Patent Application No. 10-2015-0063177 (publication No. 10-2016-0132166).

As described above, in a calibration method suggested by the present invention, calibration may be performed in real time during an operation of a TDD antenna. Furthermore, TX/RX calibration may be performed by one calibration H/W component and performed in real time during an operation of an antenna system. In addition, there is no need for an additional up-converter or a down-converter configured to perform TX calibration and RX calibration, other than an up-converter or a downstream converter for a transmission signal and a reception signal. That is, a down-converter for a reception signal of a specific reception path is used to down-convert a captured transmission signal, and an up-converter for a transmission signal of a specific transmission path is used to up-convert a pilot signal to be inserted into each reception path.

Figure 18:
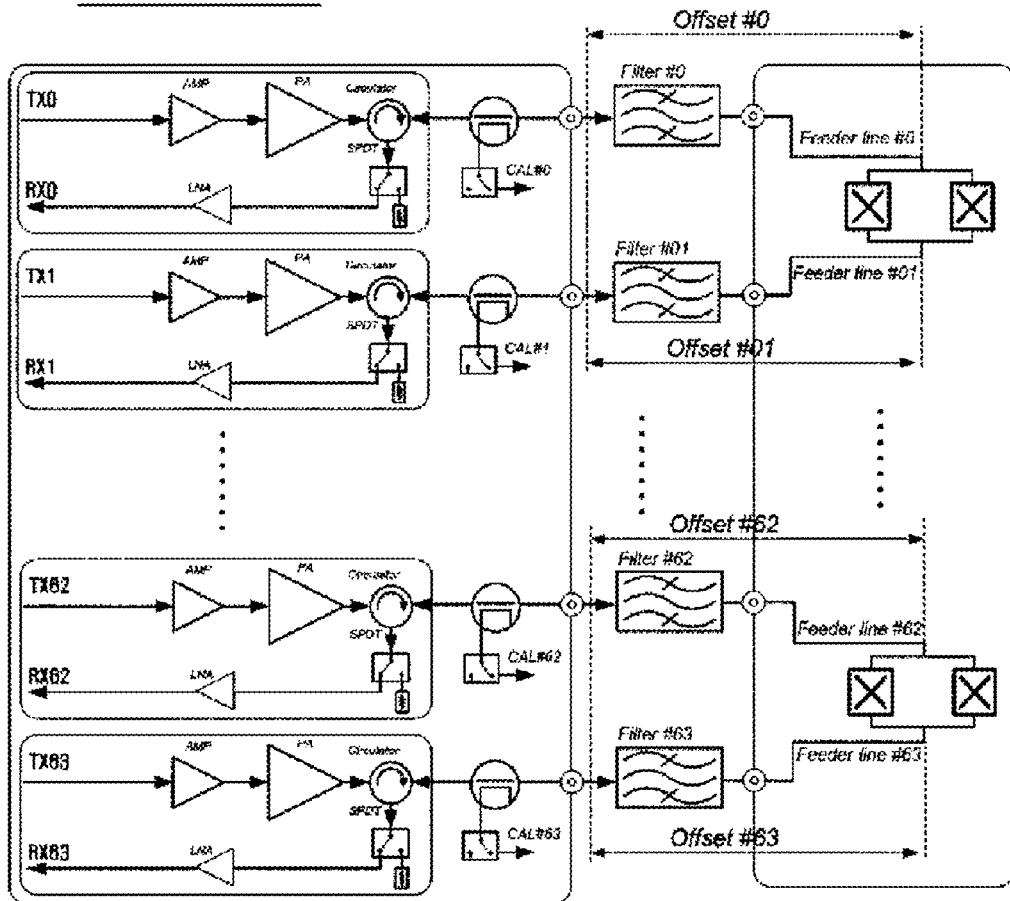
FIG. 18 is a diagram for explaining a fixed phase deviation of filters and antenna feeder lines.

FIG. 18 is a diagram for explaining a fixed phase deviation of filters and antenna feeder lines. As described above, in the previous embodiments, a calibration function is applied to a front end of a filter (i.e., an output terminal of a power amplifier) rather than a front end of an antenna element. That is, a self-transmission signal is captured at the front end of the filter and a pilot signal is inserted into the front end of the filter. Therefore, as illustrated in FIG. 18, it is inevitable that a fixed RF deviation (especially, phase deviation) of filters and antenna feeder lines is excluded from deviations measured in real time. Thus, in some embodiments, in order to compensate for a fixed RF deviation of filters and antenna feeder lines, calibration is performed by including a fixed RF deviation thereof measured in advance as an offset value in a real-time measured deviation between each transmission path and each reception path. That is, calibration may be performed for each of transmission paths after an RF deviation of a plurality of band-pass filters and antenna feeder lines measured in advance is included as an offset value in a deviation between the transmission paths. Furthermore, calibration may be performed for each of reception paths after an RF deviation of a plurality of band-pass filters and antenna feeder lines measured in advance is included as offset values in a deviation between the reception paths. A phase deviation caused due to the filters and the antenna feeder lines may be managed at an acceptable level by producing or using filters with a fixed phase deviation.

Although the above-described embodiments have been described above assuming that calibration is applied to a front end of a filter, the calibration method suggested by the present invention is also applicable to a configuration in which calibration is applied to a front end of an antenna, i.e., a configuration in which lowest switches of a calibration network are coupled to the front end of the antenna.

The above description is merely intended to explain examples of the technical ideas of embodiments and thus various modifications and changes may be made by those of ordinary skilled in the art without departing from the essential features of embodiments. Accordingly, the embodiments set forth herein should be considered in a descriptive sense only and not for purposes of limitation, and the scope of the present invention is not limited by the embodiments. The scope of the embodiments is defined by the appended claims, and all technical ideas within an equivalent scope thereof will be construed as being within the scope of the embodiments.

What is claimed is:

1. A multiple-input multiple-output (MIMO) antenna system comprising:
a radome;
a housing including a heat sink on a rear side thereof; and
an antenna assembly having a stacked structure and embedded between the radome and the housing,
wherein the antenna assembly comprises:
a first printed circuit board (PCB) on which a feeding network is provided;
a plurality of antenna elements provided on an upper surface of the first PCB,
and electrically connected to the feeding network;
a second PCB arranged under the first PCB, the second PCB including:
a plurality of transmitting and receiving circuits; and
a digital circuit being configured to perform digital processing on a baseband signal and electrically connected to the plurality of transmitting and receiving circuits; and
a filter assembly disposed between the first PCB and the second PCB, the filter assembly including the plurality of band-pass filters which are assembled in a line on a push bar,
wherein a filter body of each of the plurality of band-pass filters is attached to the first PCB, and a first port of each of the plurality of band-pass filters is directly connected to the feeding network without radio-frequency (RF) cabling, and
wherein, when the push bar is fastened to the second PCB, a second port of each of the plurality of band-pass filters is directly connected to one of the transmitting and receiving circuits without RF cabling.

2. The MIMO antenna system of claim 1, wherein the push bar fastened to the second PCB is configured to apply uniform pressure to the plurality of band-bass filters such that the plurality of band-pass filters are coupled to the second PCB by a uniform force.

3. The MIMO antenna system of claim 1, wherein a plurality of through-holes electrically connected to the feeding network are further provided in the first PCB,
the first port of each of the plurality of band-pass filters comprises a conductive pin extending from an internal cavity and protruding from an upper surface of the band-pass filter, and
the filter body of each of the plurality of band-pass filters is fastened to the first PCB such that a portion of the conductive pin is inserted into one of the plurality of through-holes of the first PCB.

4. The MIMO antenna system of claim 1, wherein a plurality of contact pads connected to the feeding network are provided on the first PCB,
the first port of each of the plurality of band-pass filters comprises a conductive plunger electrically connected to an internal cavity and protruding from an upper surface of the band-pass filter, and
the filter body of each of the plurality of band-pass filters is fastened to the first PCB such that a portion of the conductive plunger is in contact with one of the plurality of contact pads on the first PCB.

5. The MIMO antenna system of claim 1, wherein a plurality of contact pads connected to the feeding network are provided on the first PCB,
the first port of each of the plurality of band-pass filters comprises:
a conductive pin extending from an internal cavity and protruding from an upper surface of the band-pass filter; and a conductive rod fixed on an end of the conductive pin, and wherein the filter body of each of the plurality of band-pass filters is fastened to the first PCB such that a portion of the conductive rod is in contact with one of the plurality of contact pads on the first PCB.

6. The MIMO antenna system of claim 1, wherein a plurality of RF sockets connected to the plurality of transmitting and receiving circuits are mounted on an upper surface of the second PCB, the second port of each of the plurality of band-pass filters comprises:

a protruding part protruding from a lower surface of the band-pass filter and including a groove in a center thereof, wherein one of the plurality of RF sockets is inserted into the groove; and a conductive pin extending from an internal cavity and passing through the groove of the protruding part, and wherein each of the plurality of band-pass filters is coupled to the second PCB such that a portion of the conductive pin is inserted into a groove formed in one of the plurality of RF sockets.

7. The MIMO antenna system of claim 1, wherein a plurality of structures each including a contact pad electrically connected to one of the plurality of transmitting and receiving circuits are mounted on an upper surface of the second PCB, the second port of each of the plurality of band-pass filters comprises a conductive plunger extending from an internal cavity and protruding from a lower surface of the band-pass filter, and the filter body of each of the plurality of band-pass filters is coupled to the second PCB such that a portion of the conductive plunger is in contact with one of the plurality of contact pads.

8. The MIMO antenna system of claim 1, wherein a plurality of structures each including a contact pad electrically connected to one of the plurality of transmitting and receiving circuits are mounted on an upper surface of the second PCB, the second port of each of the plurality of band-pass filters comprises:

a conductive pin extending from an internal cavity and protruding from a lower surface of the band-pass filter; and a conductive rod fixed on an end of the conductive pin in a vertical direction, and wherein the filter body of each of the plurality of band-pass filters is coupled to the first PCB such that a portion of the conductive rod is in contact with the contact pad.

9. The MIMO antenna system of claim 1, wherein the second PCB further includes:

a calibration circuit with a plurality of switches connected in a tree structure; and a plurality of directional couplers are coupled at nodes connecting the plurality of transmitting and receiving circuits with the plurality of band-pass filters and are electrically connected to the calibration circuit without radio-frequency (RF) cabling to form calibration paths.

10. The MIMO antenna system of claim 1, wherein at least one ground plane is provided on the first PCB, the at least one ground plane functioning as a reflector for a plurality of antenna elements.

11. A multiple-input multiple-output (MIMO) antenna assembly having a stacked structure, comprising:

a first printed circuit board (PCB) on which a feeding network is provided;

a plurality of antenna elements provided on an upper surface of the first PCB, and electrically connected to the feeding network;

a second PCB arranged under the first PCB, the second PCB including:

a plurality of transmitting and receiving circuits; and a digital circuit being configured to perform digital processing on a baseband signal and electrically connected to the plurality of transmitting and receiving circuits; and a filter assembly disposed between the first PCB and the second PCB, the filter assembly including the plurality of band-pass filters which are assembled in a line on a push bar, wherein a filter body of each of the plurality of band-pass filters is attached to the first PCB, and a first port of each of the plurality of band-pass filters is directly connected to the feeding network without radio-frequency (RF) cabling, and wherein, when the push bar is fastened to the second PCB, a second port of each of the plurality of band-pass filters is directly connected to one of the transmitting and receiving circuits without RF cabling.

12. The MIMO antenna assembly of claim 11, wherein the push bar fastened to the second PCB is configured to apply uniform pressure to the plurality of band-bass filters such that the plurality of band-pass filters are coupled to the second PCB by a uniform force.

13. The MIMO antenna assembly of claim 11, wherein a plurality of through-holes electrically connected to the feeding network are further provided in the first PCB, the first port of each of the plurality of band-pass filters comprises a conductive pin extending from an internal cavity and protruding from an upper surface of the band-pass filter, and the filter body of each of the plurality of band-pass filters is fastened to the first PCB such that a portion of the conductive pin is inserted into one of the plurality of through-holes of the first PCB.

14. The MIMO antenna assembly of claim 11, wherein a plurality of contact pads connected to the feeding network are provided on the first PCB, the first port of each of the plurality of band-pass filters comprises a conductive plunger electrically connected to an internal cavity and protruding from an upper surface of the band-pass filter, and the filter body of each of the plurality of band-pass filters is fastened to the first PCB such that a portion of the conductive plunger is in contact with one of the plurality of contact pads on the first PCB.

15. The MIMO antenna assembly of claim 11, wherein a plurality of contact pads connected to the feeding network are provided on the first PCB, the first port of each of the plurality of band-pass filters comprises:

a conductive pin extending from an internal cavity and protruding from an upper surface of the band-pass filter; and a conductive rod fixed on an end of the conductive pin, and wherein the filter body of each of the plurality of band-pass filters is fastened to the first PCB such that a portion of the conductive rod is in contact with one of the plurality of contact pads on the first PCB.

16. The MIMO antenna assembly of claim 11, wherein a plurality of RF sockets connected to the plurality of transmitting and receiving circuits are mounted on an upper surface of the second PCB, the second port of each of the plurality of band-pass filters comprises:

a protruding part protruding from a lower surface of the band-pass filter and including a groove in a center thereof, wherein one of the plurality of RF sockets is inserted into the groove; and a conductive pin extending from an internal cavity and passing through the groove of the protruding part, and wherein each of the plurality of band-pass filters is coupled to the second PCB such that a portion of the conductive pin is inserted into a groove formed in one of the plurality of RF sockets.

17. The MIMO antenna assembly of claim 11, wherein a plurality of structures each including a contact pad electrically connected to one of the plurality of transmitting and receiving circuits are mounted on an upper surface of the second PCB, the second port of each of the plurality of band-pass filters comprises a conductive plunger extending from an internal cavity and protruding from a lower surface of the band-pass filter, and the filter body of each of the plurality of band-pass filters is coupled to the second PCB such that a portion of the conductive plunger is in contact with one of the plurality of contact pads.

18. The MIMO antenna assembly of claim 11, wherein a plurality of structures each including a contact pad electrically connected to one of the plurality of transmitting and receiving circuits are mounted on an upper surface of the second PCB, the second port of each of the plurality of band-pass filters comprises:

a conductive pin extending from an internal cavity and protruding from a lower surface of the band-pass filter; and a conductive rod fixed on an end of the conductive pin in a vertical direction, and wherein the filter body of each of the plurality of band-pass filters is coupled to the first PCB such that a portion of the conductive rod is in contact with the contact pad.

19. The MIMO antenna assembly of claim 11, wherein the second PCB further includes:

a calibration circuit with a plurality of switches connected in a tree structure; and a plurality of directional couplers are coupled at nodes connecting the plurality of transmitting and receiving circuits with the plurality of band-pass filters and are electrically connected to the calibration circuit without radio-frequency (RF) cabling to form calibration paths.

20. The MIMO antenna system of claim 11, wherein at least one ground plane is provided on the first PCB, the at least one ground plane functioning as a reflector for a plurality of antenna elements.

* * * * *